United States Patent [19]

Takizawa et al.

[11] Patent Number: 5,483,384
[45] Date of Patent: Jan. 9, 1996

[54] LENS ACCESSORY ATTACHING MECHANISM

[75] Inventors: Morio Takizawa; Atsushi Matsuda; Tetsuo Sekiguchi, all of Tokyo, Japan

[73] Assignee: Asahi Kogaku Kogyo Kabushiki Kaisha, Tokyo, Japan

[21] Appl. No.: 200,515

[22] Filed: Feb. 23, 1994

[30] Foreign Application Priority Data

Feb. 25, 1993 [JP] Japan .................................. 5-037124

[51] Int. Cl.$^6$ ........................................................ G02B 7/02
[52] U.S. Cl. .......................... 359/827; 359/830; 354/286; 354/195.11
[58] Field of Search ......................... 359/819, 827, 359/828, 830, 694; 354/286, 287, 195.11; 74/527

[56] References Cited

U.S. PATENT DOCUMENTS

| | | | |
|---|---|---|---|
| 2,500,050 | 3/1950 | Wittel | 359/830 |
| 3,906,534 | 9/1975 | Shirasaki | 359/828 |
| 4,017,878 | 4/1977 | Hagiwara | 354/286 |
| 4,066,330 | 1/1978 | Jones | 359/827 |
| 4,305,386 | 12/1981 | Tawara | 359/827 |
| 4,384,767 | 5/1983 | Kawai | 359/827 |
| 4,408,499 | 10/1983 | Haneishi | 74/527 |
| 4,898,453 | 2/1990 | Hohenecker | 359/830 |
| 5,223,980 | 6/1993 | Hamasaki | 359/694 |
| 5,227,825 | 7/1993 | Eguchi et al. | 354/287 |
| 5,313,329 | 5/1994 | Ueda | 359/676 |

*Primary Examiner*—Loha Ben
*Attorney, Agent, or Firm*—Sandler, Greenblum & Bernstein

[57] ABSTRACT

A lens accessory attaching mechanism is provided to attach a lens accessory to a lens barrel. The lens attaching mechanism has four pairs of first and second rollers attached to the proximal end portion of the lens accessory into which the distal end of the lens barrel is inserted. The first and second rollers are equiangularly spaced in the circumferential direction of the lens accessory and are movable in a radial direction thereof. A ring spring arranged around all of the first and second rollers urges the rollers radially inwardly. An outer flange portion formed on the outer periphery of the lens barrel abuts the first and second rollers to restrict the movement of the lens accessory in the axial direction of the lens barrel. Four engaging protrusions which are formed on the outer periphery of the lens barrel in front of the outer flange portion, and equiangularly arranged in the circumferential direction of the lens barrel, engage either of the first or second rollers upon rotation of the lens accessory to securely attach the lens accessory to the lens barrel.

37 Claims, 27 Drawing Sheets

5,483,384

LENS ACCESSORY ATTACHING MECHANISM

BACKGROUND OF THE INVENTION

The present invention relates to a lens accessory attaching mechanism for attaching a lens accessory to a lens barrel, and more specifically to a lens accessory attaching mechanism for attaching a lens accessory such as a lens hood to a lens barrel of a camera or a telescope.

A lens hood prevents unwanted ambient light from entering the lens, but does not affect the angle of view. Thus, glare from the sun or a bright light can be shielded, resulting in a better photograph being taken. Conventionally, a lens accessory, such as a lens hood, is capable of being detachably attached to a distal end of a lens barrel of a camera, by the use of a bayonet mounting mechanism.

In the conventional bayonet mount mechanism, a predetermined part of the lens hood is rotated in sliding contact with a predetermined portion of the lens barrel. Thus torque must be applied to the lens hood to overcome the frictional force that is established between the lens hood and lens barrel in order to attach the lens hood to the lens barrel. Repeated attaching and detaching of the lens hood to the lens barrel results in the surface of the lens barrel being worn down. When the lens barrel surface is worn down it is not possible to maintain good contact between the lens hood and the lens barrel. Thus, the lens hood may rattle or even fall off the lens barrel. Further, the click feeling, that lets the operator know that the lens hood has been properly attached, is inconsistent or no longer present.

SUMMARY OF THE INVENTION

It is therefore an object of the present invention to provide a lens accessory attaching mechanism by which a lens accessory can be easily attached to or detached from a lens barrel, and the outer peripheral surface of the lens barrel is not defaced when the lens accessory is attached to or detached from the lens barrel.

It is another object of the present invention to provide a lens accessory attaching mechanism by which a sufficient attaching or detaching feeling is given to an operator, and the outer peripheral surface of the lens barrel is not defaced when the lens accessory is attached to or detached from the lens barrel.

It is another object of the present invention to provide a lens accessory attaching mechanism by which a lens accessory can be easily attached to or detached from a lens barrel, and the lens accessory is prevented from inadvertently falling off the lens barrel.

According to one aspect of the present invention, there is provided a lens accessory attaching mechanism for detachably attaching a lens accessory to a lens barrel, the mechanism includes at least two rollable members provided to one end portion of the lens accessory into which the distal end of the lens barrel is inserted. The rollable members are equiangularly arranged in a circumferential direction of the lens accessory and are movable in a radial direction thereof and urged to move radially inwardly. A restricting device is formed on the outer periphery of the lens barrel, for restricting the insertion of the lens accessory to the lens barrel in an axial direction thereof by being abutted against the rollable members; A plurality of engaging device have the same number as that of the rollable members. The engaging device is formed on the outer periphery of the lens barrel in front of the restricting means, and equiangularly arranged in the circumferential direction of the lens barrel, for being engaged with the respective rollable members upon the rotation of the lens accessory in one direction while the rollable members abut against the restricting device.

According to another aspect of the present invention, there is provided a lens accessory attaching mechanism for detachably attaching a lens accessory to a lens barrel, the mechanism includes at least two rollable members provided to one end portion of the lens accessory which has an inner circumferential surface into which the outer circumferential surface of the lens barrel is inserted. The rollable members are equiangularly arranged in the circumferential direction of the lens accessory and are movable in a radial direction thereof. A ring spring is arranged around all of the rollable members to urge them radially inwardly, with an outer flange portion formed around the entire outer circumferential surface of the lens accessory attachment ring to extend radially outwardly, for restricting the insertion of the lens accessory relative to the lens barrel in an axial direction thereof by a predetermined amount of the insertion by being abutted against the rollable members. A plurality of engaging devices the number of which corresponds to the number of the rollable members. An engaging means is formed on the outer circumferential surface of the lens barrel in front of the restricting device, and equiangularly arranged in the circumferential direction of the lens barrel, for being engaged with the respective rollable members upon the rotation of the lens accessory in one direction while the rollable members abut against the restricting device.

According to a different aspect of the present invention, there is provided a lens accessory which is to be attached to a lens barrel, which includes an annular member secured to the proximal end portion of the lens accessory. At least two rollable means provided between the proximal end and the annular member, with the rollable means being equiangularly arranged in the circumferential direction of the lens accessory and being movable in a radial direction thereof. A ring spring is arranged around all of the rollable devices to urge them radially inwardly thereby protruding a part of each of the rollable devices radially inwardly from the inner circumferential surface of the annular member.

The above and other objects, features and advantages of the present invention will become apparent from the following detailed description which is to be read in conjunction with the accompanying drawings.

DESCRIPTION OF THE ACCOMPANYING DRAWINGS

DESCRIPTION OF THE EMBODIMENTS

One embodiment of a lens accessory attaching mechanism according to the present invention will now be described in detail with reference to the accompanying drawings of FIGS. 1 to 21.

Figure 1:
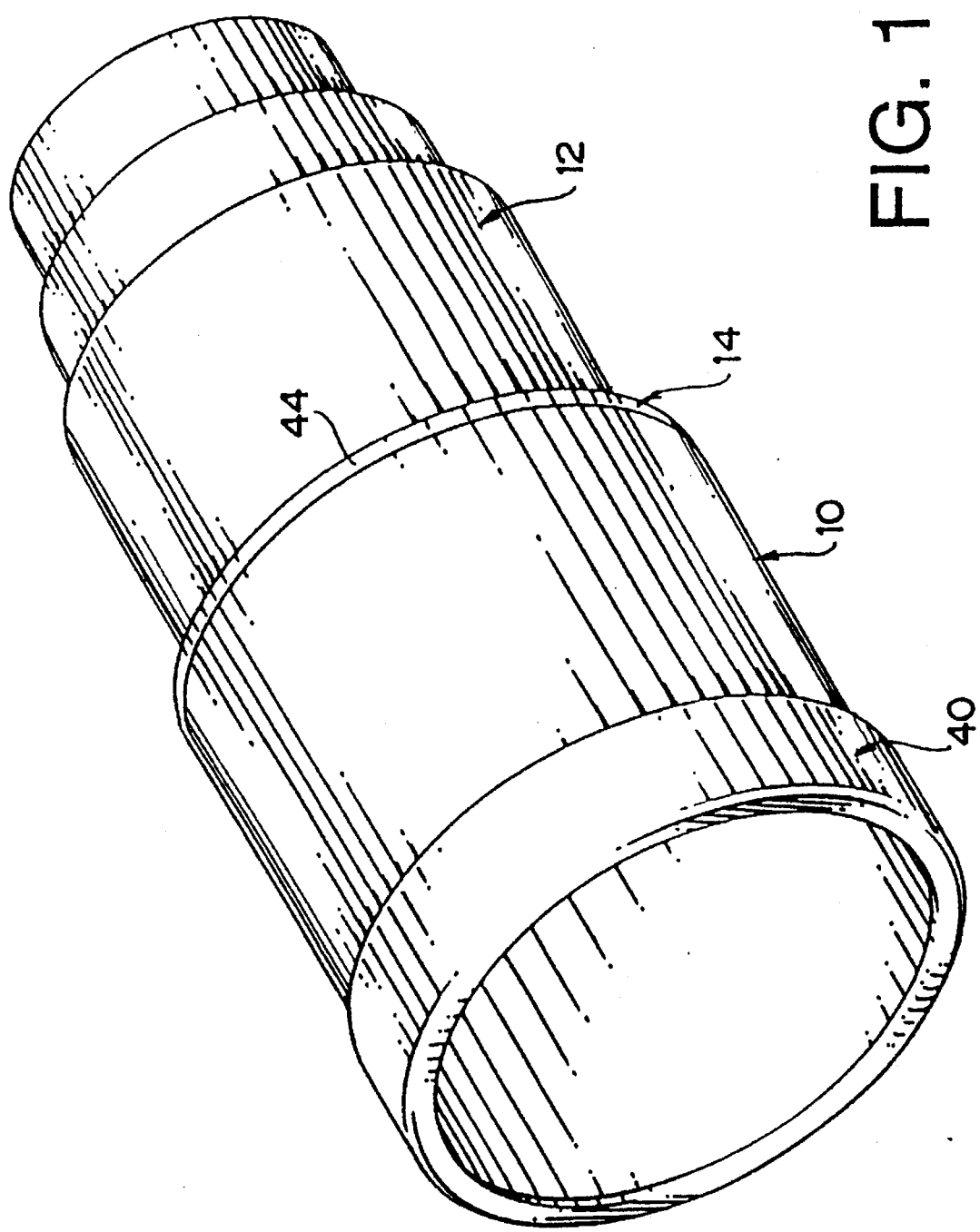
FIG. 1 is a perspective view of a lens hood mounted in the operating position to a lens barrel, by means of a lens hood attaching mechanism, as one embodiment of a lens accessory attaching mechanism according to the present invention.
Figure 2:
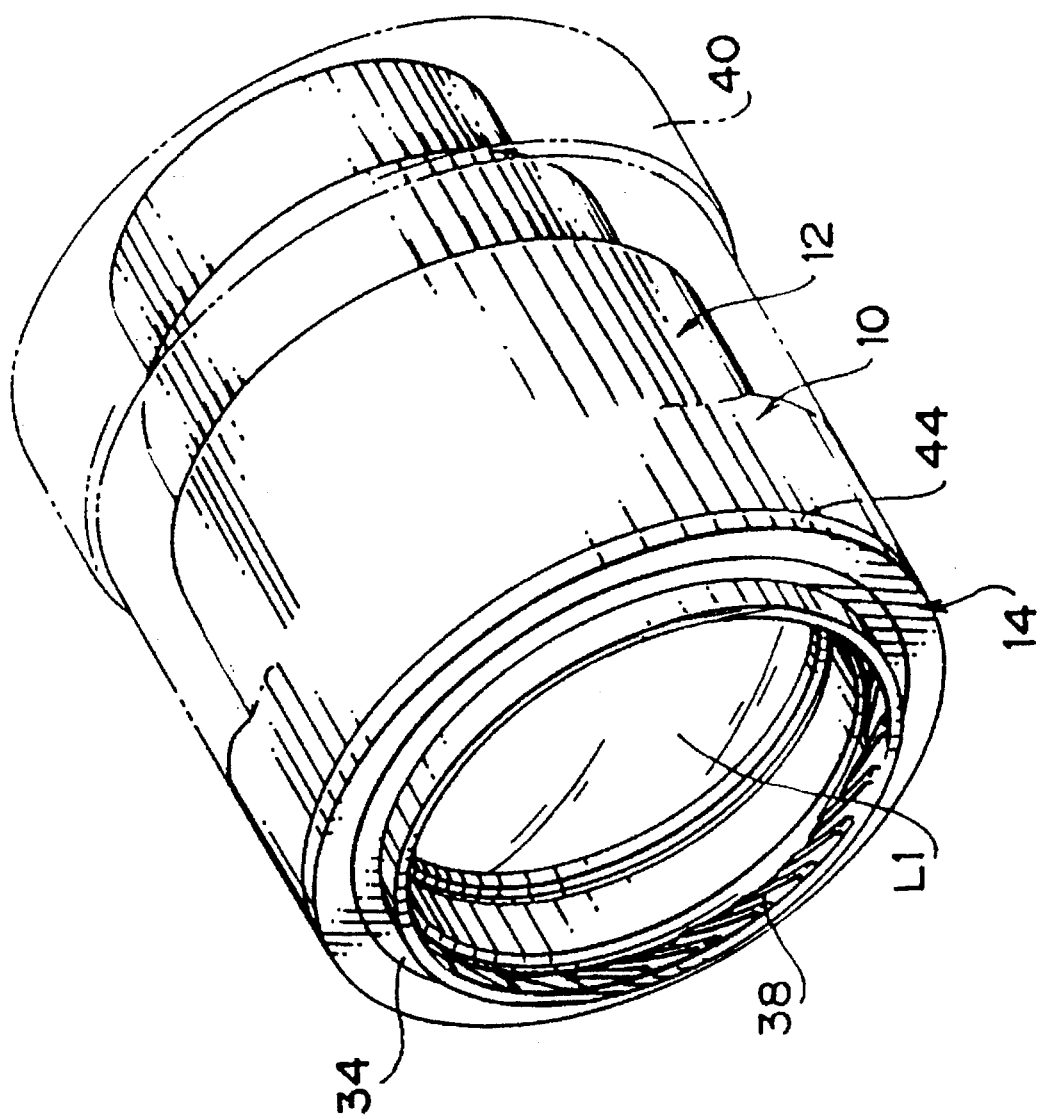
FIG. 2 is a perspective view of the lens hood mounted in the non-operating position to the lens barrel, by means of the lens hood attaching mechanism.

FIG. 1 shows a lens hood 10 attached to a lens barrel 12 and extending forward from the distal end of the lens barrel 12 in order to prevent unwanted ambient light from being incident of the lens. This is an operating position of the lens hood. FIG. 2 shows the lens hood 10 attached to the lens barrel 12 and retraced back from the distal end of the lens barrel 12. This is a non-operating position of the lens hood.

Figure 3:
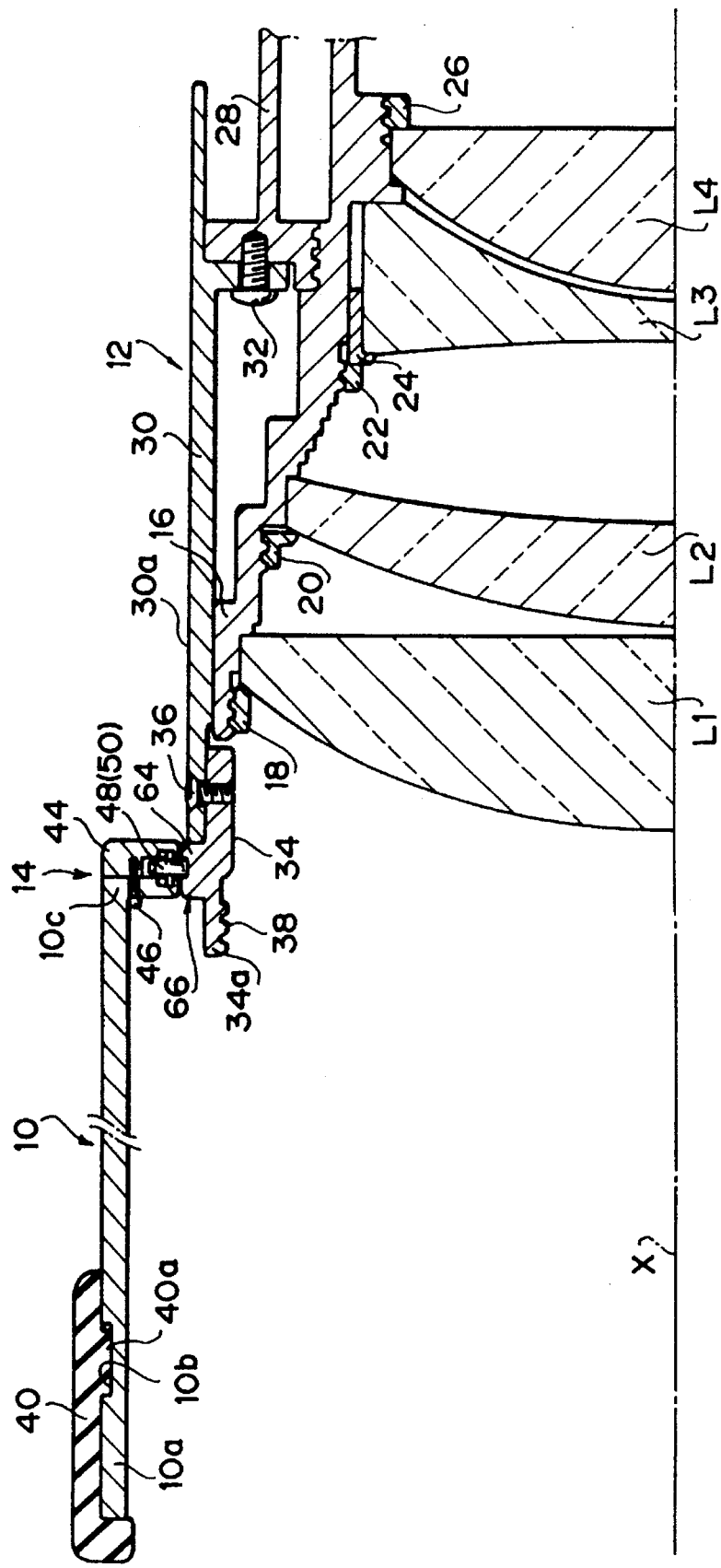
FIG. 3 is a side vertical cross-sectional view of the lens hood attaching mechanism when the lens hood is positioned as shown in FIG. 1.
Figure 4:
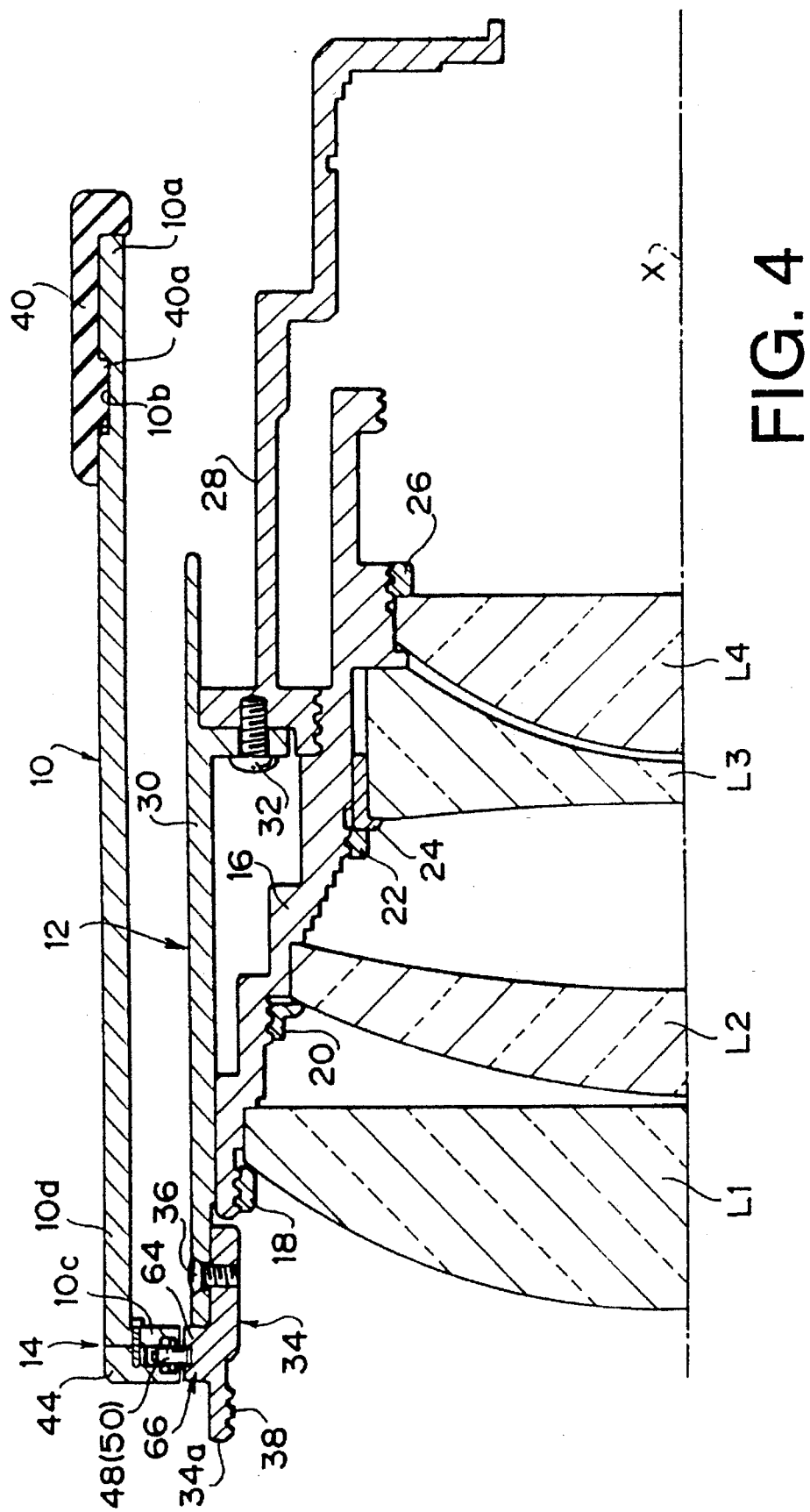
FIG. 4 is a side vertical cross-sectional view showing the lens hood attaching mechanism when the lens hood is positioned as shown in FIG. 2.

The lens barrel 12, in the present embodiment, is of an exchangeable type which is detachably attached to a camera body of a single-lens reflex camera. FIGS. 3 and 4 show the lens barrel 12 having first to fourth photographing lenses L1 to L4 therein, arranged from the distal end side to the proximal end side, respectively. A lens holding frame 16 is provided inside the inner circumferential surface of the lens barrel 12. The lens holding frame supports the first photographing lens L1 by means of a first lens hold ring 18, the second photographing lens L2 by means of a second lens hold ring 20, the third photographing lens L3 by means of a third and fourth lens hold rings 22 and 24, and the fourth photographing lens L4 by means of a fifth lens hold ring 26.

The lens holding frame 16 is screwed to a connecting ring 28 which is arranged inside the lens barrel 12. The connecting ring 28 is fixed to an outer ring 30 by means of screws 32, and defines the outer periphery of the lens barrel 12.

Attached to the distal end portion 30a of the outer ring 30 is a lens hood attachment ring 34 which constitutes a part of the lens hood attaching mechanism 14 on the lens barrel 12 side. The lens hood attachment ring 34 is fixed to the inner circumferential surface of the outer ring 30 by means of screws 36 which are equally spaced about the inner circumferential surface of the outer ring 30. Formed on the inner circumferential surface of distal end portion 34a of the lens hood attachment ring 34 is a female threaded groove 38 to which lens accessory, such as a filter, can be attached.

The lens hood 10 is equipped with a hood protection ring 40 connected to the distal end portion 10a of the lens hood 10 for protection. The hood protection ring 40 has an annular protrusion 40a on the inner peripheral surface thereof and the lens hood 10 has a circumferential groove 10b on the outer peripheral surface thereof so that the annular protrusion 40a is fitted into the circumferential groove 10b thereby fixing the hood protection ring 40 to the outer periphery of the distal end portion 10a of the lens hood 10.

An inner flange portion 10c is integrally formed to the proximal end portion 10d of the lens hood 10. The inner flange portion 10c of the lens hood 10 is detachably attached to the lens hood attachment ring 34 secured to the distal end of the lens barrel 12, by means of the lens hood attaching mechanism 14. In the operating position, the lens hood 10 extends forward from the lens hood attachment ring 34 as shown in FIGS. 1 and 3. In the non-operating position, the lens hood extends backward from the lens hood attachment ring 34 as shown in FIGS. 2 and 4.

Hereinafter, the description of the lens hood attaching mechanism 14 will be given in detail with reference to FIGS. 5 through 21.

Figure 5:
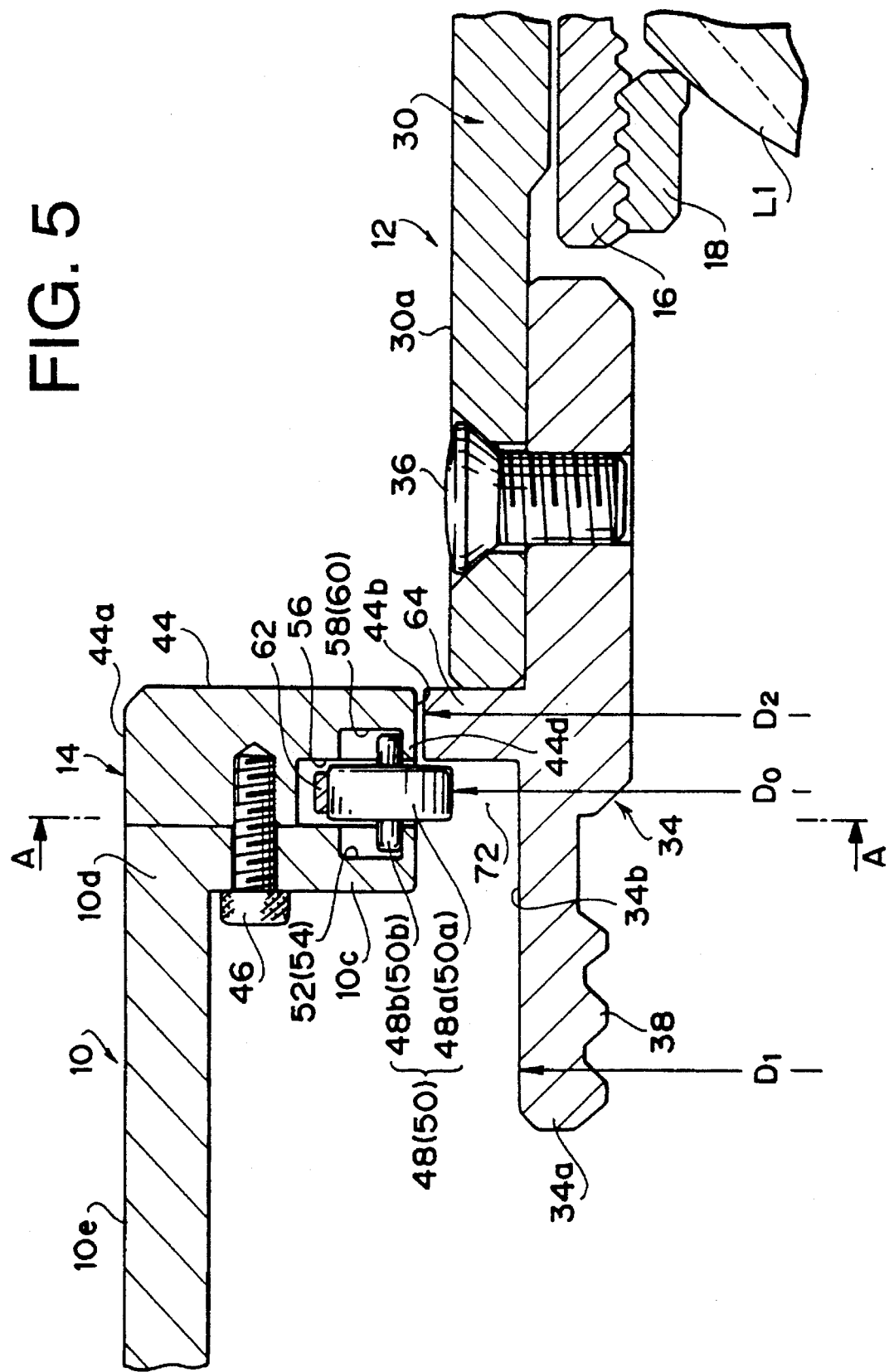
FIG. 5 is an enlarged side cross-sectional view showing the construction of the lens hood attaching mechanism wherein the first and second rollers are positioned such that the lens hood is in a detachable state.

As shown in FIG. 5, the lens hood attaching mechanism 14 includes an annular member 44 to be fixed to the rear surface of the inner flange portion 10c by screws 46. The outer circumferential surface 44a of the annular member 44 is flush with the outer circumferential surface 10e of the lens hood 10. Thus, the outer diameter of the annular member 44 is the same as that of the lens hood 10, while the inner circumferential surface 44b of the annular member 44 is flush with an inner circumferential surface 10f of the inner flange portion 10c of the lens hood 10. Further, the inner diameter of the annular member 44 is the same as that of the lens hood 10.

Figure 6:
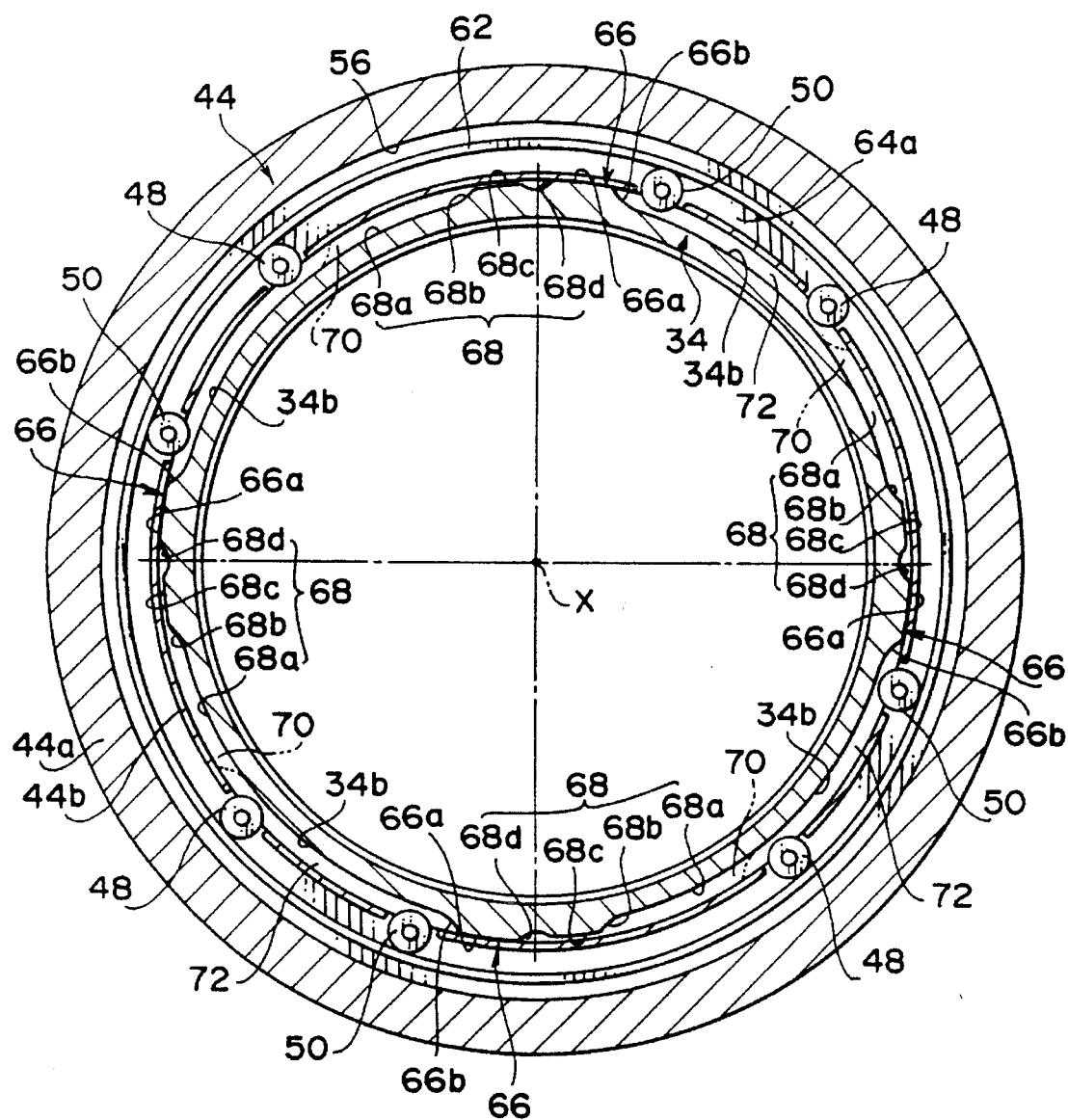
FIG. 6 is a front cross-sectional view along a line A—A of FIG. 5 showing the construction of the lens hood attaching mechanism wherein the first roller is defined to be positioned at an angle θ=0°.

As shown in FIG. 6, the lens hood attaching mechanism 14 further includes four pairs of first and second rollers 48 and 50. The first rollers 48 are utilized for attaching the lens hood 10 to the lens hood attachment ring 34 when the lens hood 10 is in the operating position shown in FIGS. 1 and 3. When the lens hood 10 is in the non-operating position, since the lens hood 10 is turned back to front, the second rollers 50 are utilized for attaching the lens hood 10 to the lens hood attachment ring 34. For each pair of rollers, the first rollers 48 are separated from the second rollers by a 30° angle, in the present embodiment.

The four pairs of first and second rollers (48,50) are separated from one another by equal 90° angles around the inner flange portion 10c of the lens hood 10, as shown in FIG. 6.

Each of the first rollers 48 includes a roller body 48a and a supporting shaft 48b which penetrates the central portion of the roller body 48a along the central axis thereof. Each of the second rollers 50 includes a roller body 50a and a supporting shaft 50b which penetrates the central portion of the roller body 50a along the central axis thereof. Each of the roller bodies 48a and 50a is made of a synthetic resin (eg. poly-acetal) having a small frictional coefficient, in the present embodiment.

All of the first and second rollers 48 and 50 are supported between the inner flange portion 10c and the annular member 44 so as to be movable in a radial direction of the lens hood 10, as well as to be rotatable about the respective supporting shafts 48a and 50a, respectively.

An annular groove 56 is formed on the front surface of the annular member 44, on the inner surface, to receive all of the first and second rollers 48 and 50. Accordingly, a bottom rib 44c, extending in the circumferential direction of the annular member 44, is formed between the bottom or outer circumferential surface 56a of the annular groove 56 and the inner circumferential surface 44b of the annular member 44.

Figure 7:
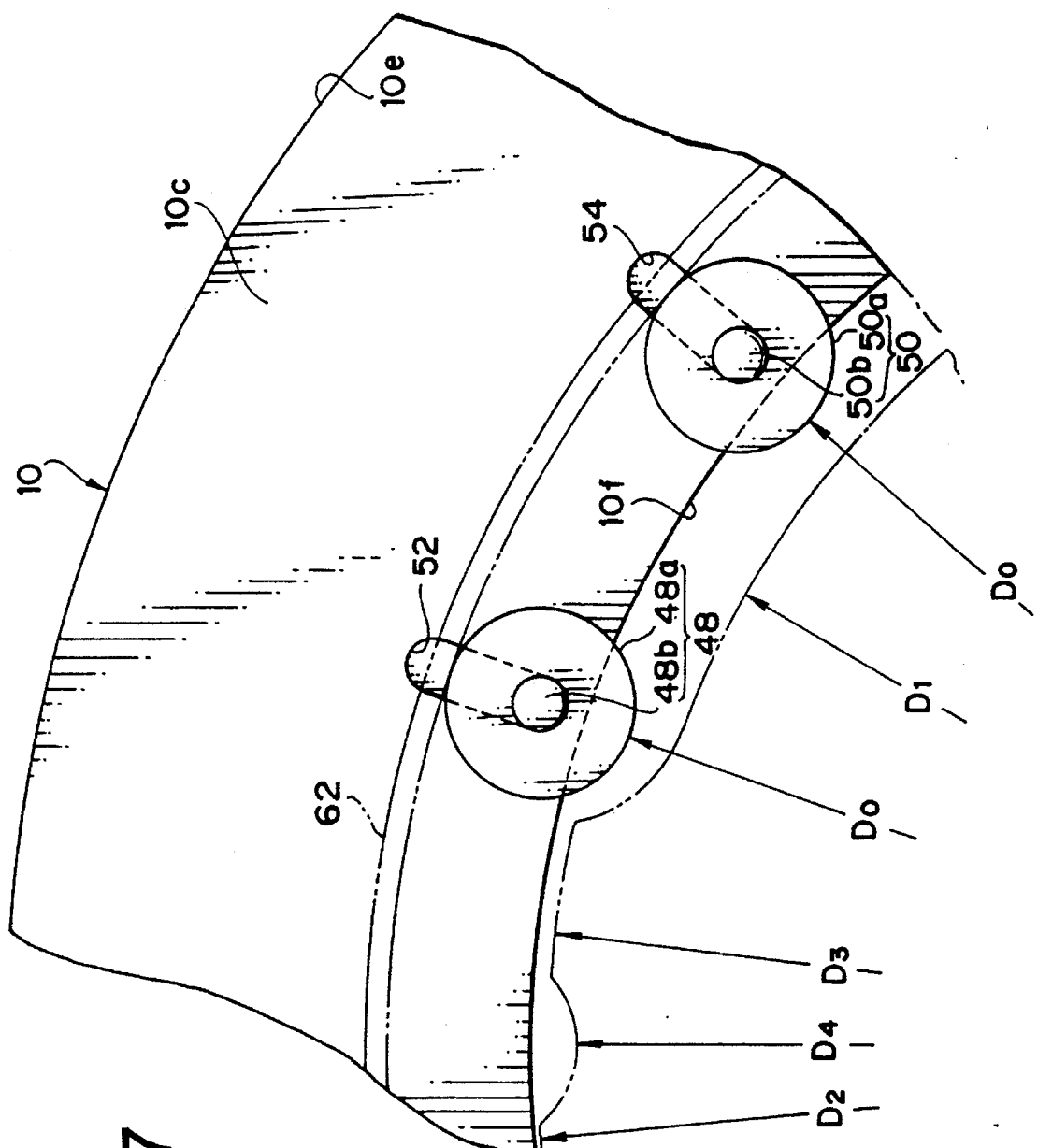
FIG. 7 is a rear view showing the proximal end portion of the lens hood when the lens hood is mounted in the operating position.

To accomplish the radial movement of the first and second rollers 48 and 50, four pairs of first and second elongated holes 52 and 54, which extend in the radial direction of the lens hood 10 and to which front end portions of supporting shafts 48b and 50b of the first and second rollers 48 and 50 are inserted, respectively, are formed on the rear surface of the inner flange portion 10d, as shown in FIG. 7. Further, four pairs of first and second elongated holes 58 and 60, which extend in the radial direction of the lens hood 10 and to which rear end portions of supporting shafts 48b and 50b of the first and second rollers 48 and 50 are inserted, respectively, are formed on the front surface of the annular groove 56 of the annular member 44, as shown in FIG. 8.

The first elongated holes 52 and 58 support shaft 48b of the first roller 48, while the second elongated holes 54 and 60 support shaft 50b of the second roller 50. Thus, the rollers 48 and 50 can move in the radial direction, from fully retracted, when the rollers 48 and 50 are pushed radially outwardly, to fully extended when the rollers 48 and 50 are pushed radially inwardly. Further, the rollers 48 and 50 can also rotate about their respective support shafts 48b and 50b at all positions between fully retracted and fully extended positions.

Figure 8:
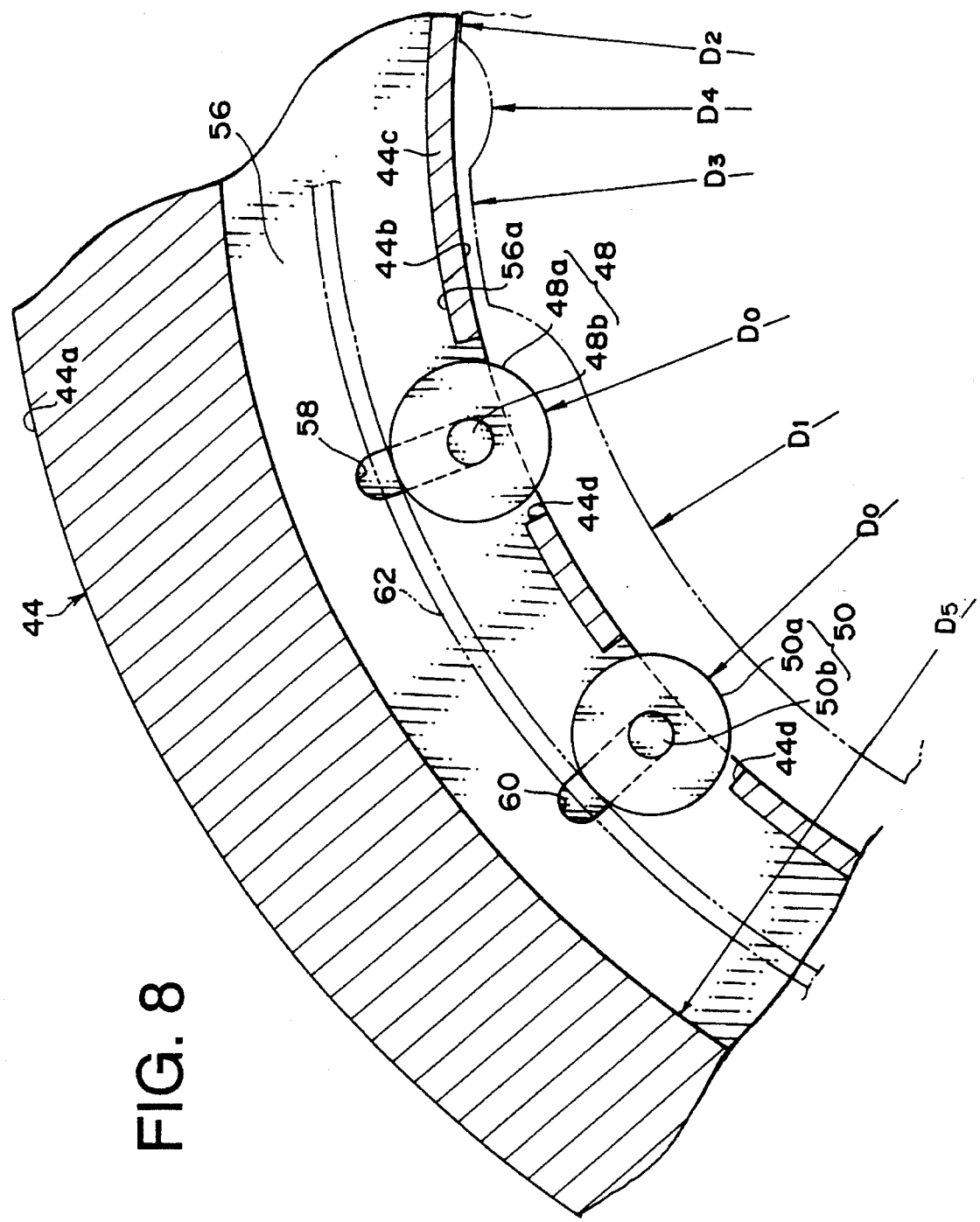
FIG. 8 is an enlarged front cross-sectional view along a line A—A of FIG. 5 showing a front portion of the annular member fixed to the rear surface of the lens hood.

As shown in FIG. 8, the bottom rib 44c has cut-out portions 44d to allow the radial movement of the first and second rollers across the plane of the rib 44c.

A single ring spring 62 is provided in an annular groove 56 so as to contact the outer circumferential surfaces of the roller bodies 48a and 50a of all of the first and second rollers 48 and 50. The ring spring 62 forces all of the first and second rollers 48 and 50 to be biased radially inwardly to the fully extended position.

Thus, the inside circumference of the ring spring is defined by a circle that circumscribes all of the first and second rollers 48 and 50, when all of the rollers 48 and 50 are biased to the fully extended position.

Figure 9:
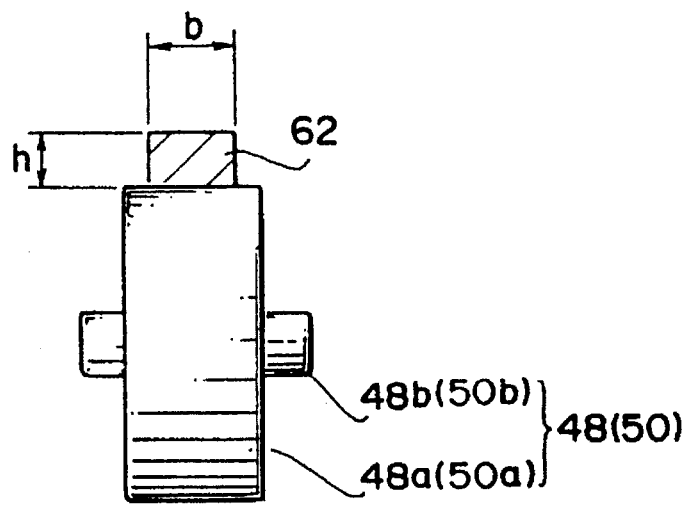
FIG. 9 is a side view of the first or second roller urged by the ring spring.
Figure 10:
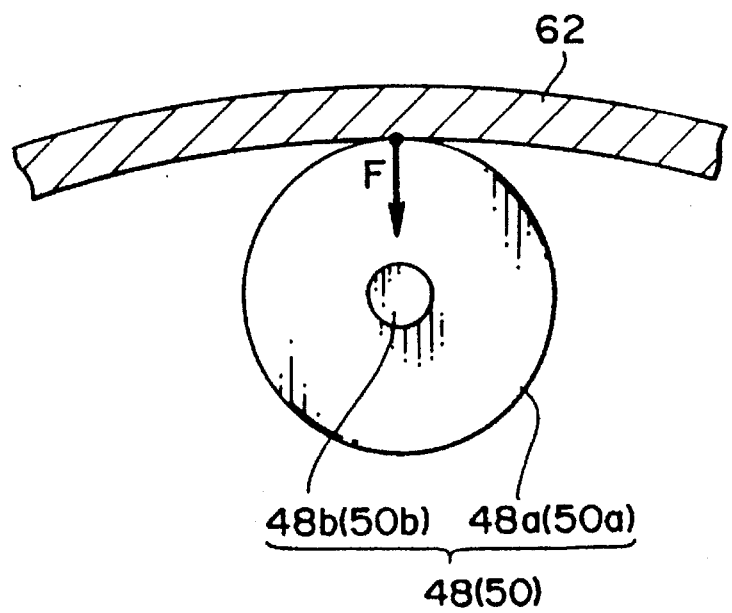
FIG. 10 is a front view of the first or second roller urged by the ring spring.

The ring spring 62 has a width b (in the axial direction) and a thickness h, as shown in FIGS. 9 and 10. The urging force (F) of the ring spring 62 is set to be proportional to the second moment (I) of area thereof (ie., $I=(1/12)bh^3$).

An imaginary inscribed circle about the center of the annular member 44 is defined by inscribing all of the most radially inward points of the first and second rollers 48 and 50, which are urged by the ring spring 62 at the fully extended position. The imaginary inscribed circle for the first and second rollers 48 and 50 has a diameter $D_0$, as shown in FIGS. 7 and 8.

The lens hood attachment ring 34 of the lens hood attaching mechanism 14 is secured to the distal end portion 30a of the outer ring 30 by the screw 36. The outer circumferential surface 34a of the lens attaching mechanism 14, which contacts the inner circumferential surface of the outer ring 30, has a predetermined diameter $D_1$, as shown in FIG. 5. The diameter $D_1$ of the outer circumferential surface 34a is smaller than the diameter $D_0$ of the imaginary inscribed circle as shown in FIGS. 5, 7 and 8.

The lens hood attachment mechanism 14 is thus secured to the lens barrel 12.

In the operating position, the lens hood 10 is first positioned proximate to the lens hood attaching mechanism 14 as shown in FIG. 5. The first and second rollers 48 and 50 do not need to contact the outer circumferential surface 34b of the lens hood attachment ring 34. Thus, the outer circumferential surface 34b is not worn down by the frictional engagement between the first and second rollers 48 and 50.

The lens hood attachment ring 34 is integrally formed with an outer flange portion 64 around the entire outer circumferential surface 34a thereof. The outer flange portion 64 has a predetermined diameter $D_2$ which is larger than the diameter $D_0$ of the imaginary inscribed circle of the first and second rollers 48 and 50, as shown in FIG. 5. Thus, the first and second rollers 48 and 50 contact the outer flange portion 64 and are prevented from moving any further along the axial direction of the lens barrel 12.

The outer flange portion 64 extends along the entire circumference of the lens hood attachment ring 34. When the lens attaching mechanism is installed onto the lens barrel 12, the outer ring 30 is aligned flush with the outer flange portion 64 of the lens hood attachment ring 34, as shown in FIGS. 5 and 11.

As shown in FIG. 6, four engaging protrusions 66 are integrally formed on the outer circumferential surface 34b of the lens hood attachment ring 34 in front of the outer flange portion 64. The four engaging protrusions 66 are equally spaced (ie., at 90 degrees) about the circumference of the lens hood attachment ring 34. As shown in FIG. 11, the outer circumferential surface 66a of each of the engaging protrusions 66 has the same diameter as the diameter $D_2$ of the circumferential surface 64a of the outer flange portion 64. Each of the engaging protrusions 66 is formed to extend in the circumferential direction of the lens hood attachment ring 34 by a predetermined angle, for example, 40 degrees in the present embodiment.

Figure 11:
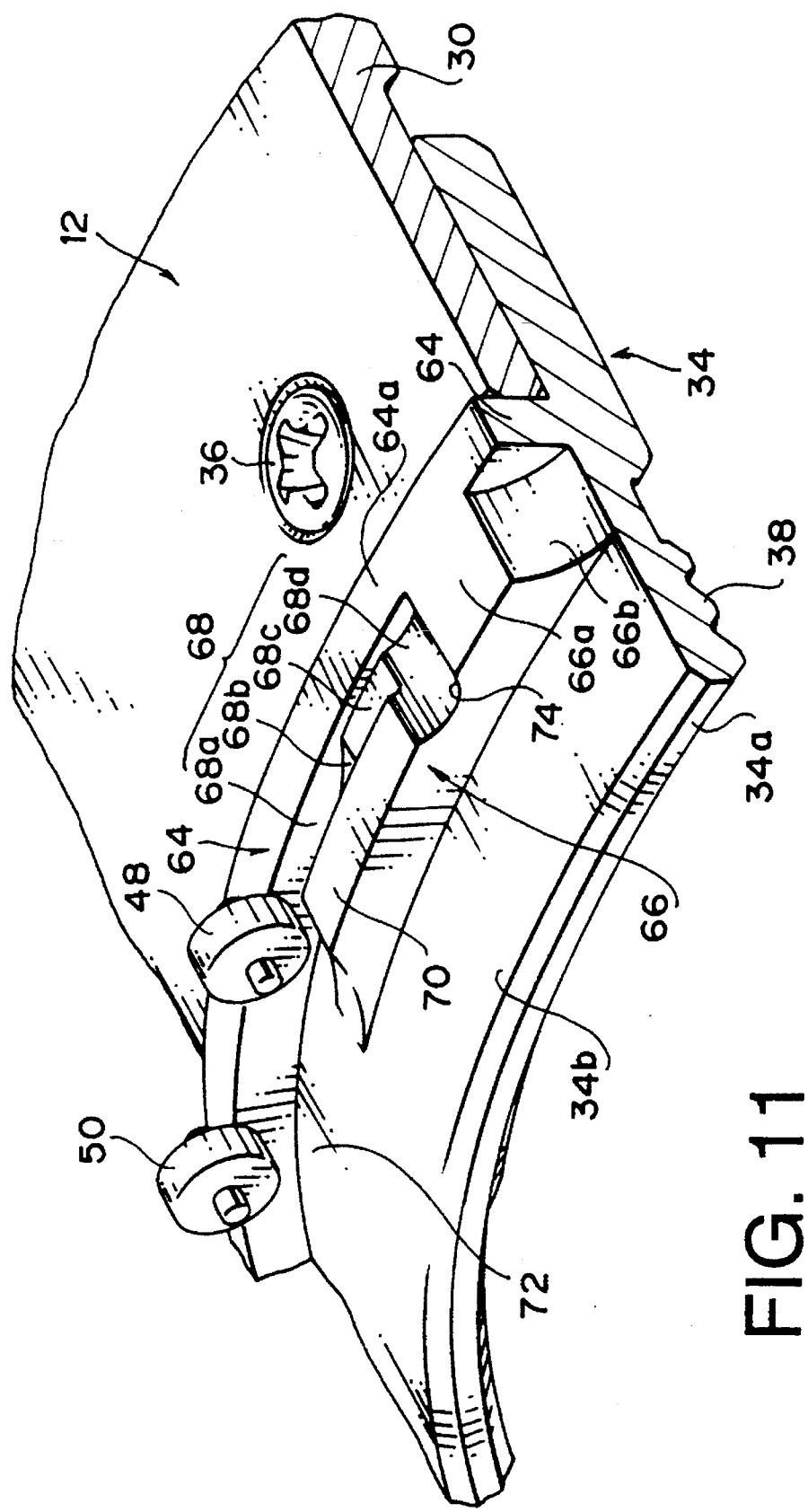
FIG. 11 is an enlarged perspective view showing the construction of the lens hood attaching mechanism on the lens barrel side wherein the first and second rollers are positioned in a guide groove portion of the engaging groove, when the lens hood is in the operating position.

An engaging groove 68 is formed on the outer circumferential surface 66a of each of the engaging protrusions 66 so as to extend in the circumferential direction of the lens hood attachment ring 34, as shown in FIG. 11. The width of the engaging groove 68 (along the optical axis direction) is slightly larger than the width of the roller body 48a or 50a of the first or second roller 48 or 50. The stopper wall 70 and the outerflange portion 64 define the boundary (in the optical axis direction) of the engaging groove 68.

Figure 12:
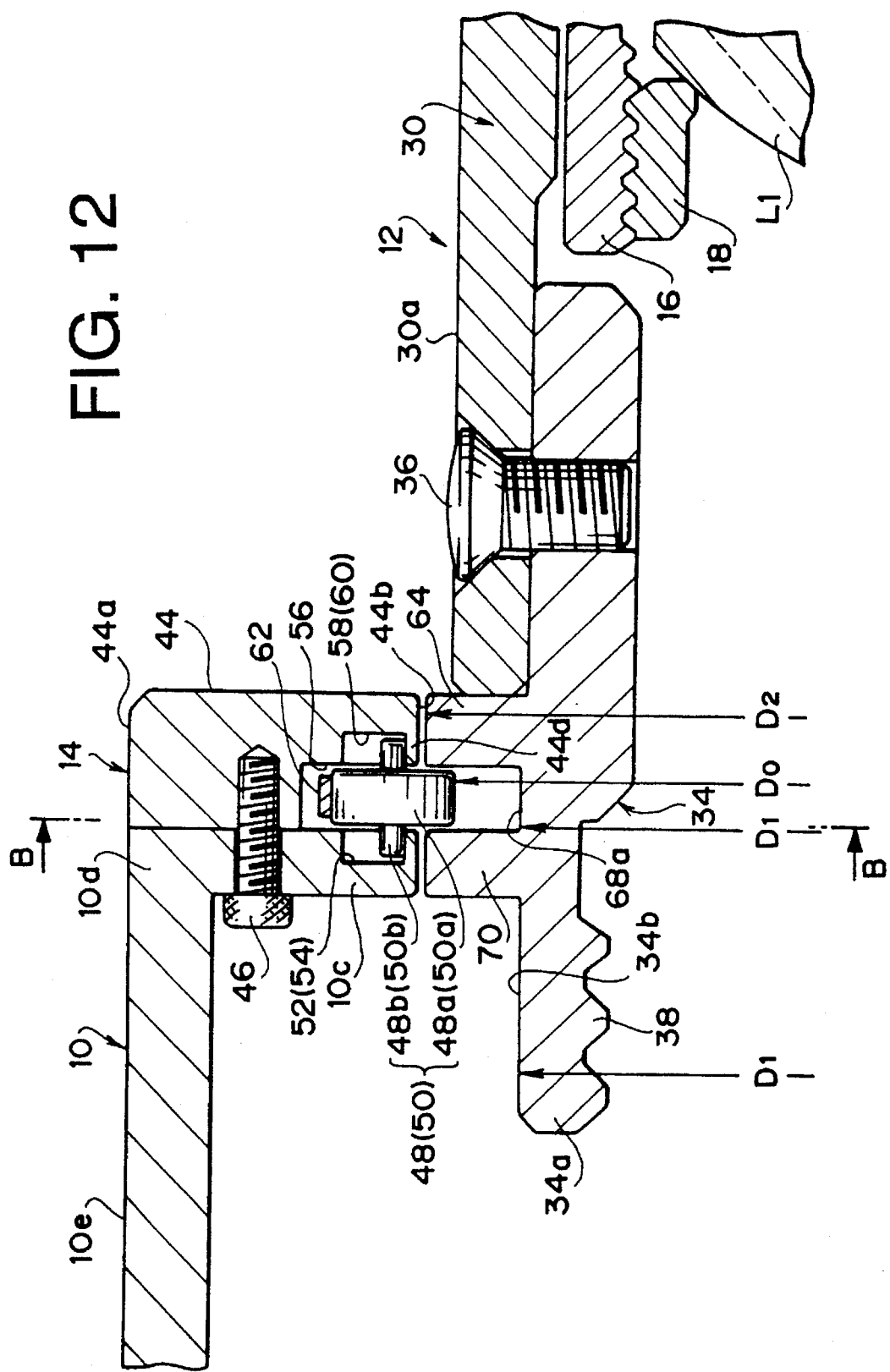
FIG. 12 is an enlarged side cross-sectional view of the lens hood attaching mechanism wherein the first roller is positioned in a guide groove portion of the engaging groove, when the lens hood is in the operating position.

Each of the engaging grooves 68 is constructed as follows:

(a) A guide groove portion 68a is provided through which the first and second rollers 48 and 50 enter the engaging groove 68 or exit therefrom. The counterclockwise end of the guide groove portion 68a is flush with the outer circumferential surface 34b of the lens hood attachment ring 34 as shown in FIGS. 11 and 12;

(b) A slant groove portion 68b is provided which is located in the clockwise direction from the guide groove portion 68a and slants upwards.

Figure 13:
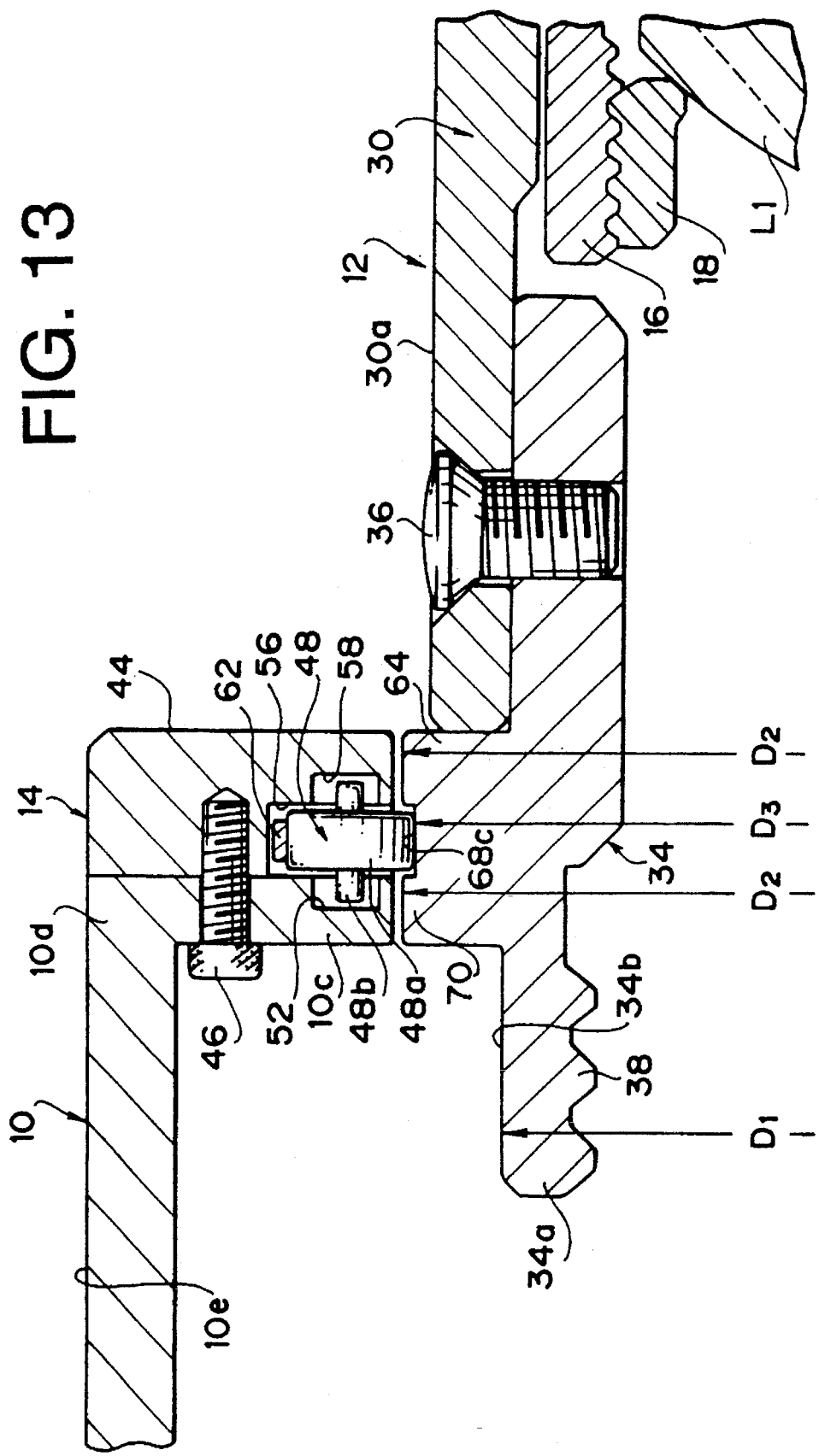
FIG. 13 is an enlarged side cross-sectional view of the lens hood attaching mechanism wherein the first roller is positioned in a frictional engaging groove portion of the engaging groove, when the lens hood is in the operating position.
Figure 14:
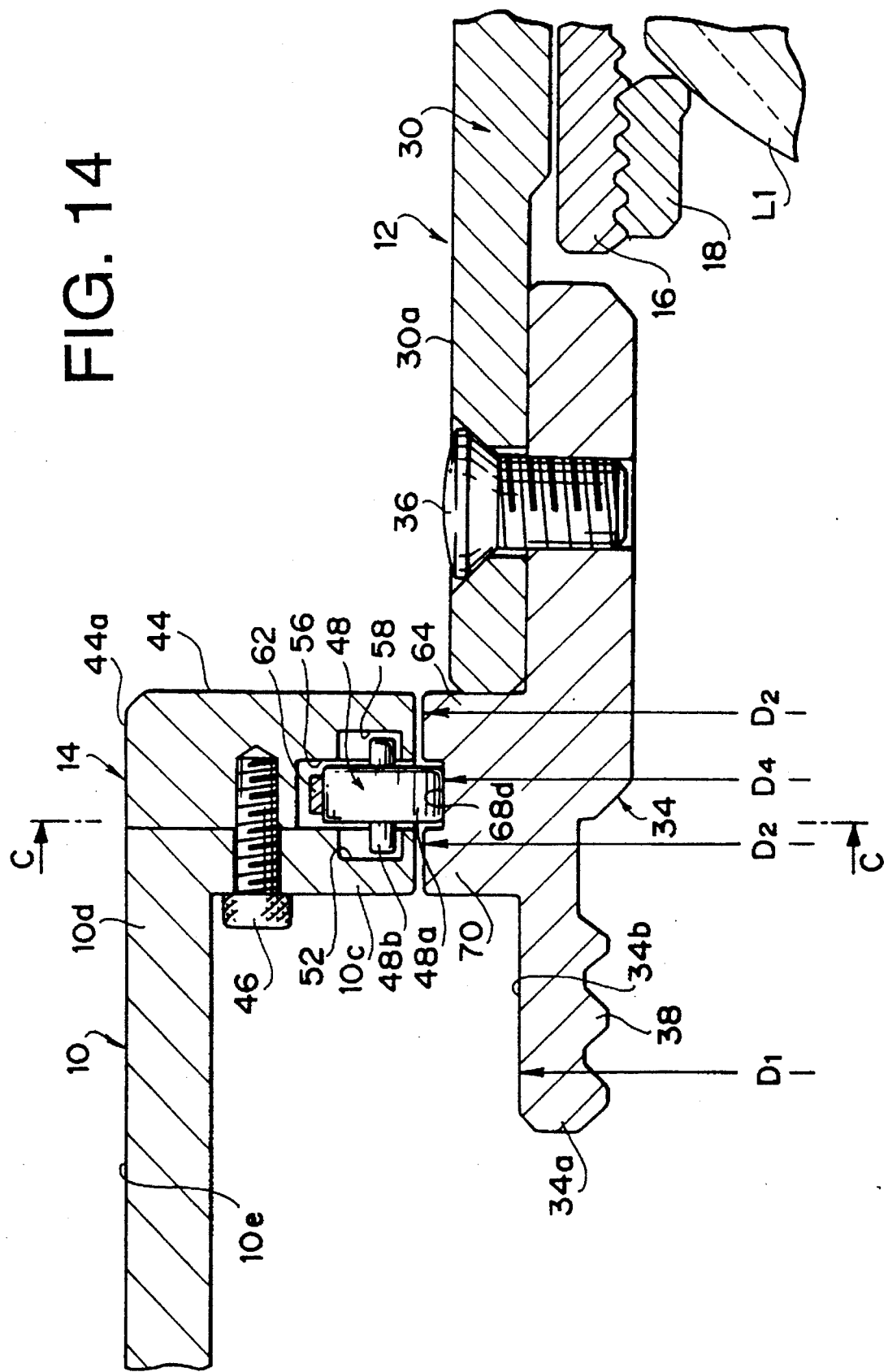
FIG. 14 is an enlarged side cross-sectional view of the lens hood attaching mechanism wherein the first roller is positioned in a click groove portion of the engaging groove, when the lens hood is in the operating position.

(c) A frictional engaging groove portion 68c is provided which is located in the clockwise direction from the slant groove portion 68b. The outer circumferential surface of the frictional engaging groove 68c has a diameter $D_3$ which is larger than the diameter $D_0$ of the imaginary inscribed circle and smaller than the diameter $D_1$ of the outer circumferential surface 66a of the engaging protrusion 66. The frictional engaging groove portion 68c displaces the first or second roller 48 or 50 radially outwardly against the urging force of the ring spring 62, as shown in FIG. 13; and (d) A click groove portion 68d is provided which is located in the clockwise direction from the frictional engaging groove portion 68c and to which the roller body 48a or 50a of the first or second roller 48 or 50 is received. The click groove portion 68d is defined by a concave surface, the diameter of which is substantially the same as that of the roller body 48a or 50a of the first or second roller 48 or 50. The distance $D_4$, from the center of the lens barrel 12 to the bottom of the click groove portion 68d, is slightly larger than the diameter $D_0$, and smaller than the diameter $D_3$. Thus, the first or second rollers 48 or 50 are held firmly in position. The lens hood 10 is therefore stably attached to the lens barrel 12. Alternatively, the diameter $D_4$ may be larger than the diameter $D_1$ and slightly smaller than the diameter $D_0$. Portion 66b prevents the rollers 48 and 50 from entering the click groove portion 68d if the lens hood 10 is initially rotated counterclockwise.

A recessed portion 74 is formed on the stopper wall 70 in front of the click groove portion 68d and flush with it, and is provided to facilitate the molding of the lens hood attachment ring 34 and the engaging groove 68, during the manufacturing process.

The installation of the lens hood attaching mechanism 14 onto the lens barrel 12 side will be described.

Figure 15:
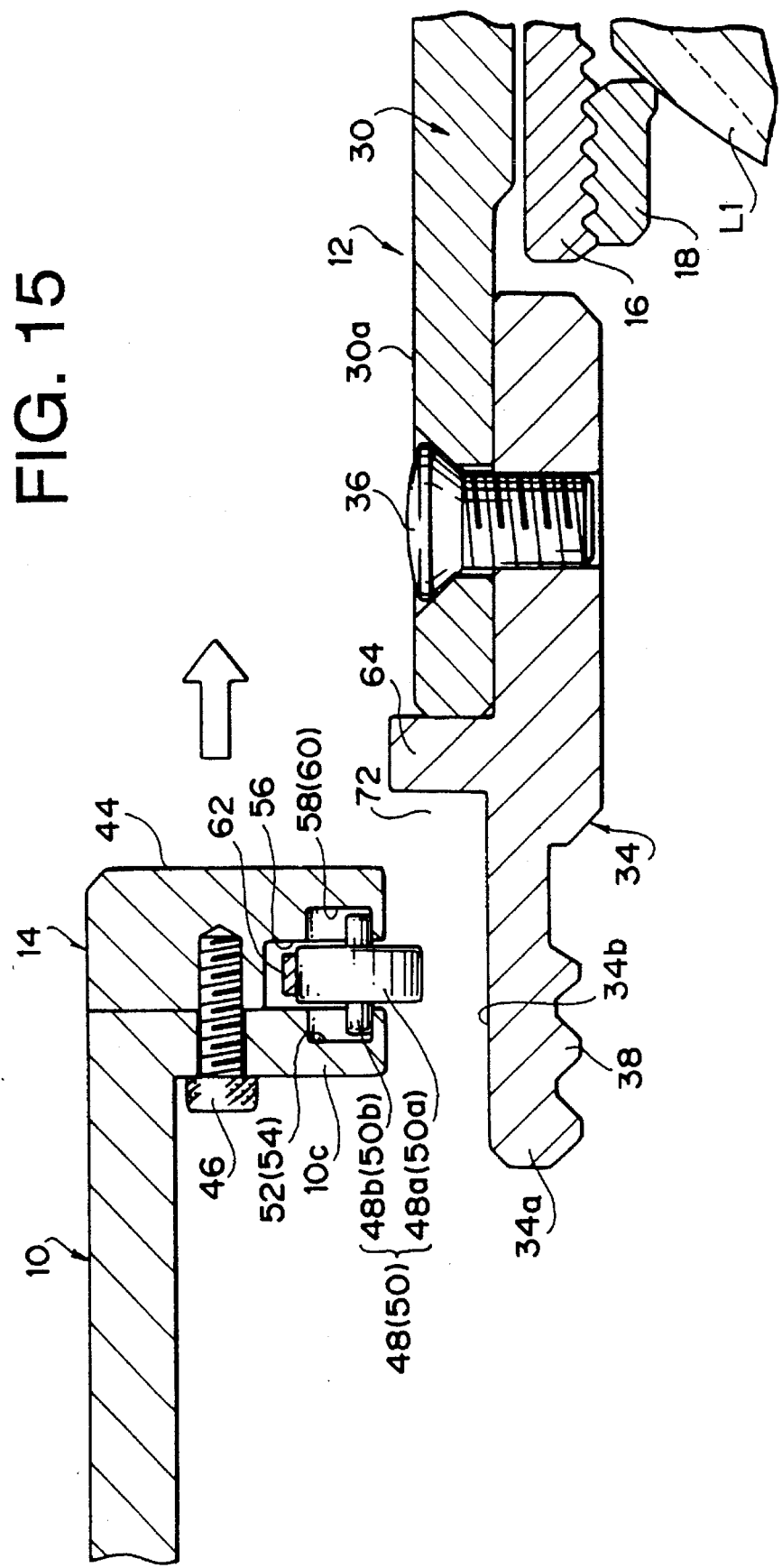
FIG. 15 is an enlarged side cross-sectional view of the lens hood attaching mechanism wherein the lens hood is being fitted into the lens barrel, when the lens hood is in the operating position.
Figure 16:
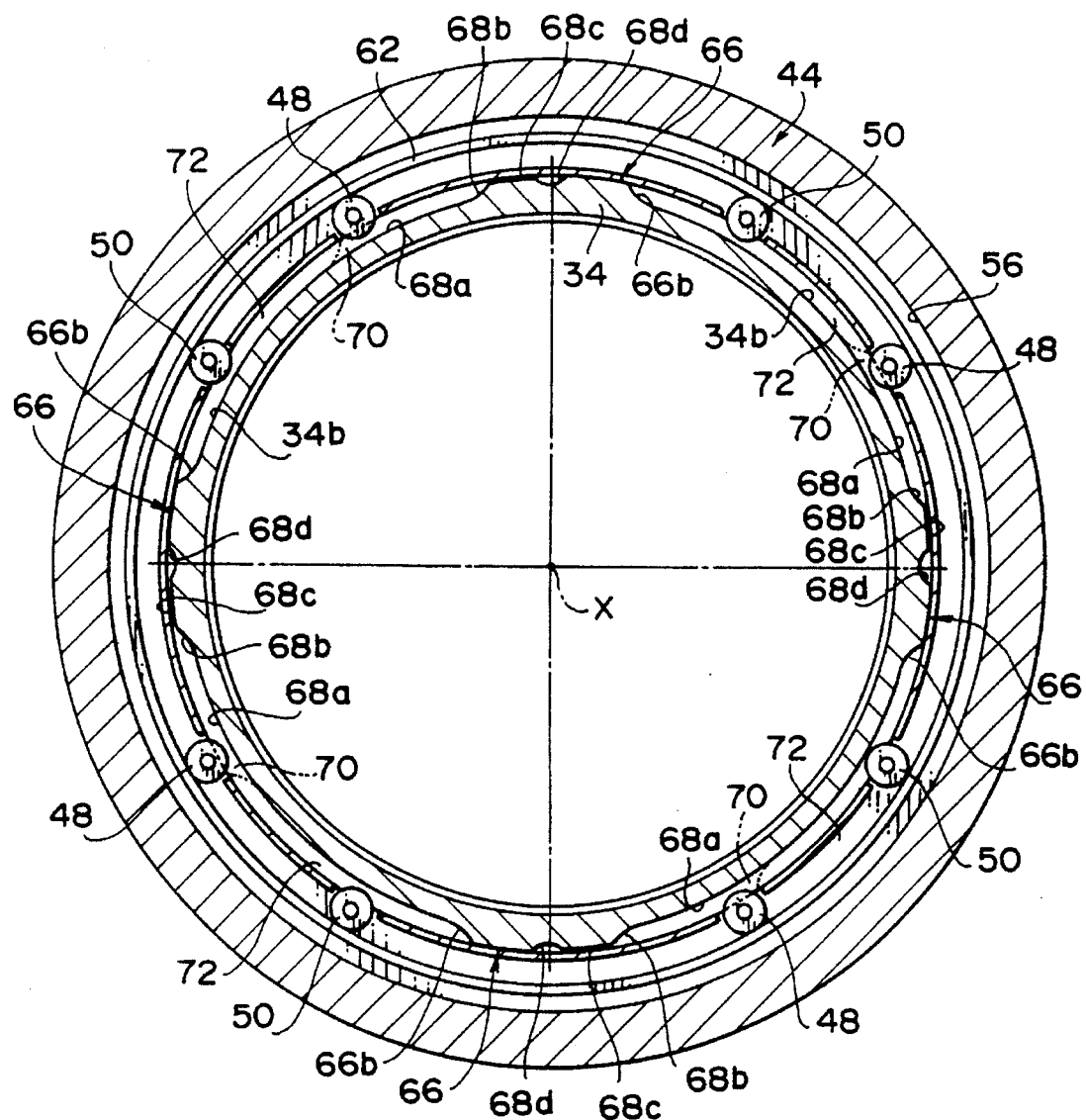
FIG. 16 is a front cross-sectional view along a line B—B of FIG. 12 showing the construction of the lens hood attaching mechanism wherein the first roller is inserted into the guide groove portion of the engaging groove while the second roller remains in an inlet/outlet port, upon the rotation of the lens hood from the condition shown in FIG. 6.
Figure 17:
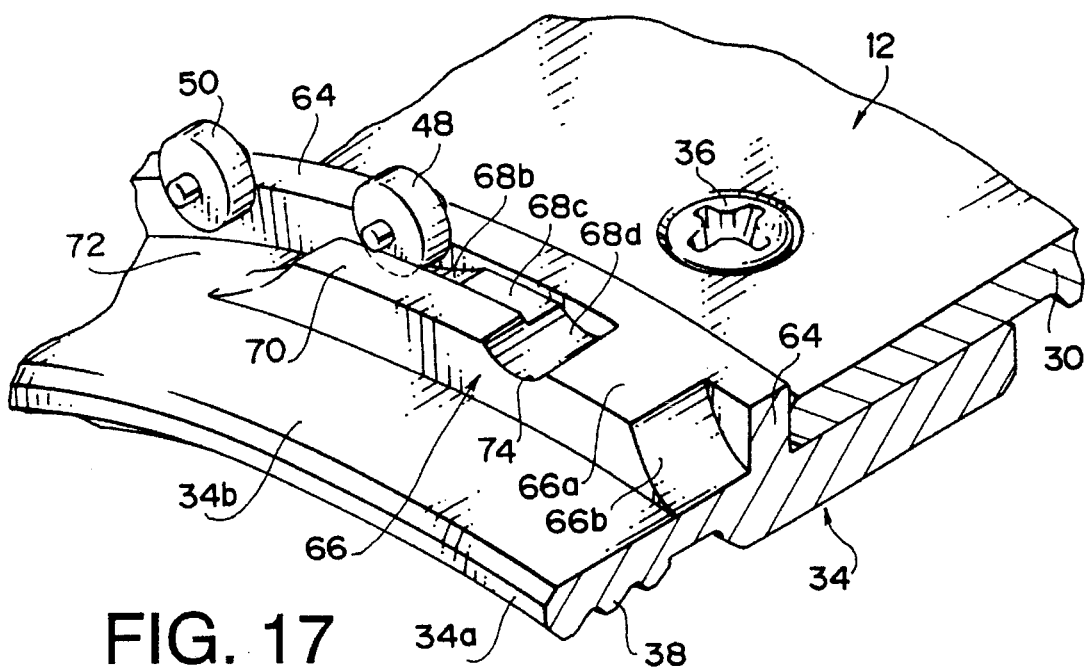
FIG. 17 is an enlarged perspective view showing the construction of a portion of the lens hood attaching mechanism on the lens barrel side for the same condition as shown in FIG. 16.

When the lens hood 10 is to be used in the operating position to shield the lens barrel 12, the lens hood 10 is moved in the axial direction of the lens barrel 12 towards the inlet port 72 of the lens attaching mechanism 14, as shown in FIG. 15. The lens hood 10 is moved until the first and second rollers 48 and 50 abut the outer flange portion 64 as shown in FIG. 5. The lens hood 10 is thus positioned such that the first and second rollers 48 and 50 are received by the guide groove 68a, as shown in FIGS. 16 and 17.

Figure 18:
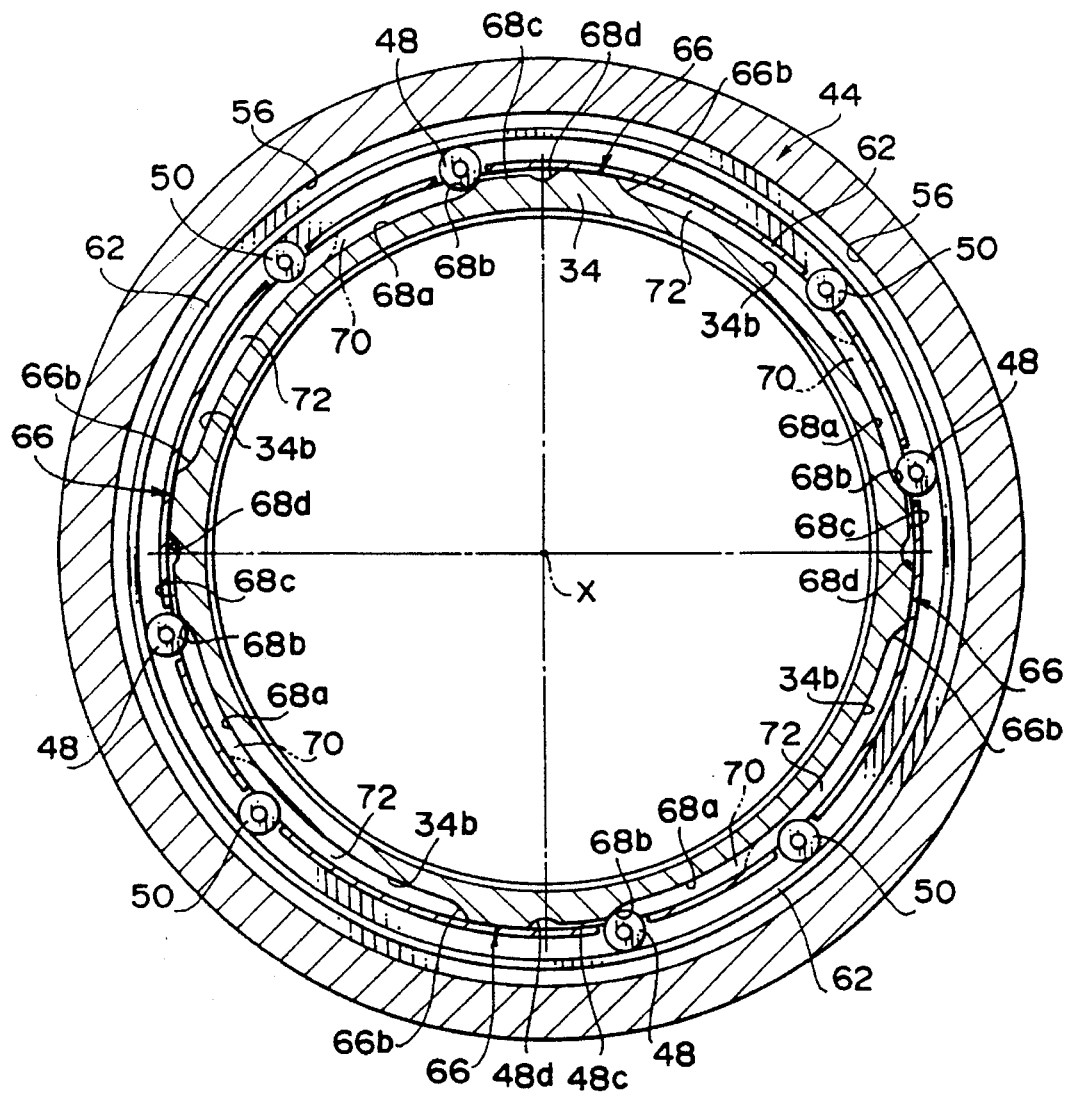
FIG. 18 is a front cross-sectional view showing the construction of the lens hood attaching mechanism wherein the first roller is positioned in the slant groove portion of the engaging groove while the second roller remains in the guide groove portion of the engaging groove upon the rotation of the lens hood, from the condition shown in FIG. 16.

The lens hood 10 is then rotated in the clockwise direction, such that the first roller 48 comes into contact with the slant groove portion 68b as shown in FIG. 18. As the lens hood 10 is turned in the clockwise direction, the first roller 48 is pressed towards its retracted position by the slant groove portion 68b, against the force of the ring spring 62. Further rotation of the lens hood 10 results in the first roller 48 contacting the frictional groove portion 68c.

Figure 20:
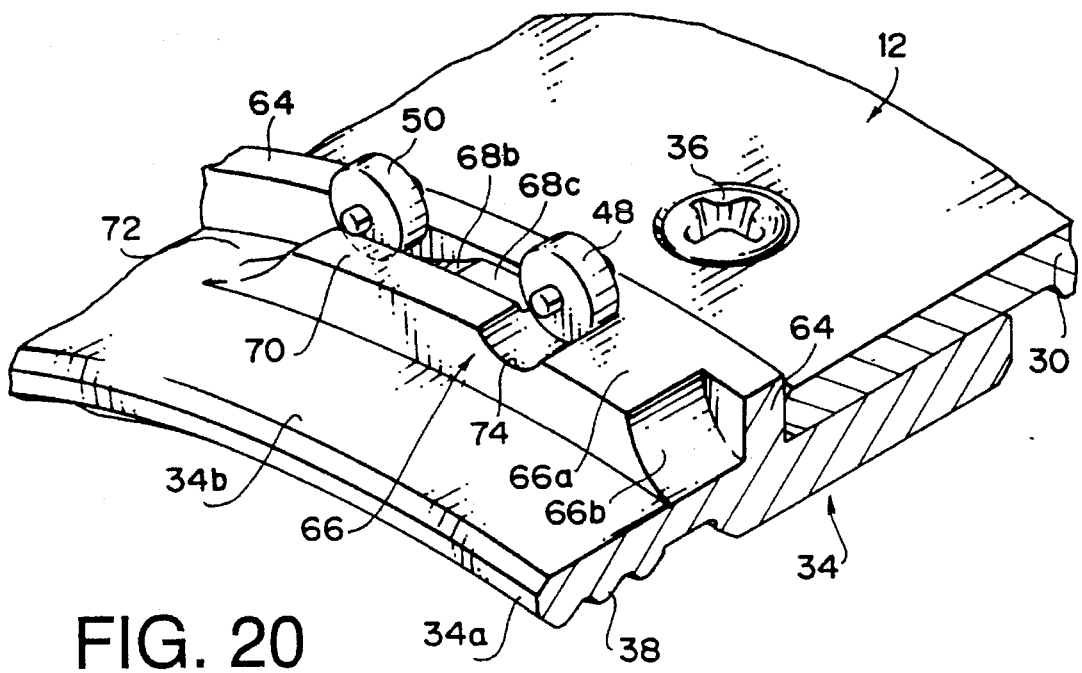
FIG. 20 is an enlarged perspective view showing the construction of a portion of the lens hood attaching mechanism on the lens barrel side, for the same condition as shown in FIG. 19.
Figure 19:
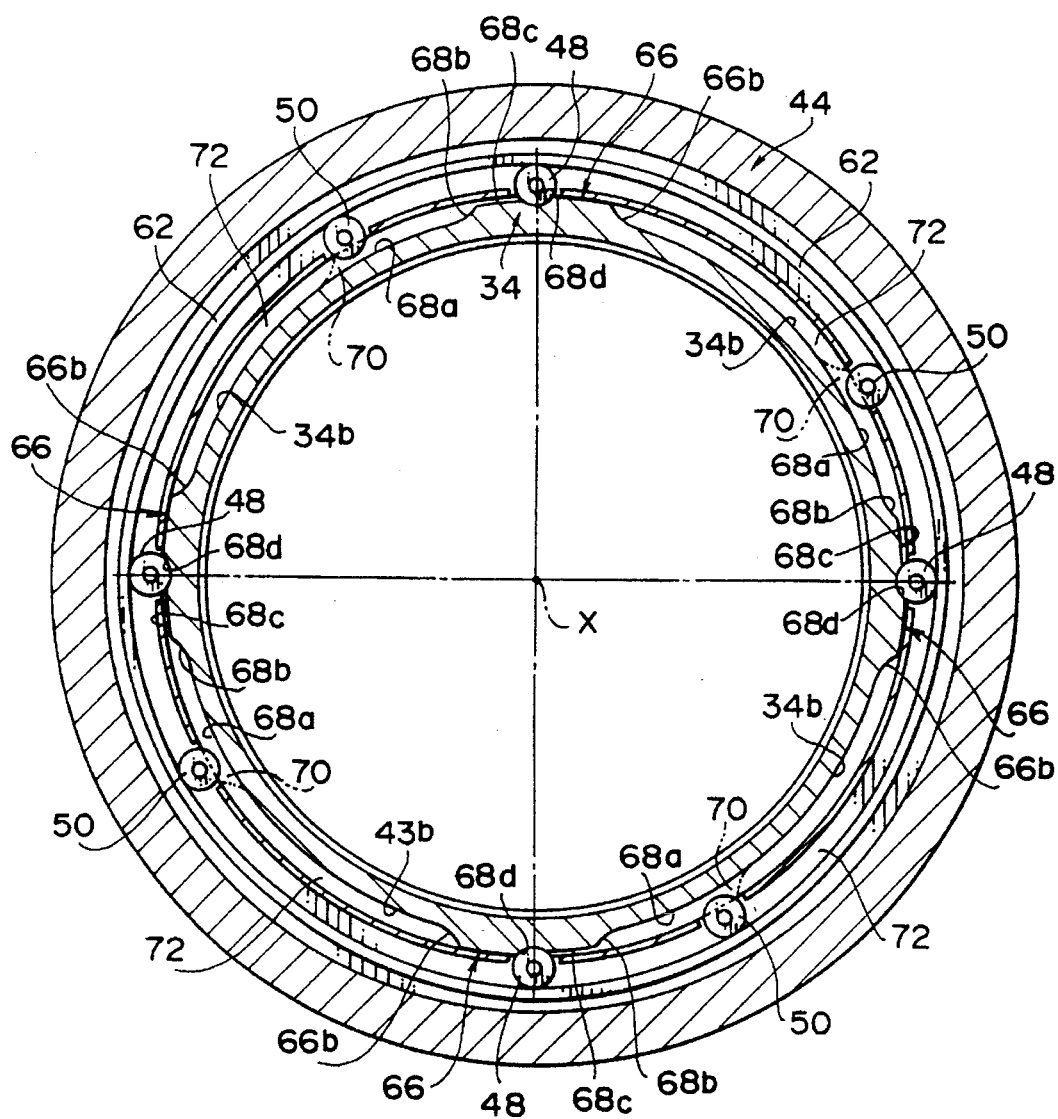
FIG. 19 is a front cross-sectional view along a line C—C of FIG. 14 showing the construction of the lens hood attaching mechanism wherein the first roller is received in a click groove portion of the engaging groove while the second roller remains in the guide groove portion of the engaging groove upon the rotation of the lens hood, from a condition shown in FIG. 18.

To fully secure the lens hood 10 to the lens attaching mechanism 14, the first roller 48 must be moved to the click groove portion 68d, as shown in FIGS. 19 and 20. Thus, the lens hood 10 must be further turned in the clockwise direction. However, the first roller 48, located in its most retracted state, exerts a force on the frictional-groove portion 68c, which must be overcome by applying a torque T (see FIG. 21), in order to move the lens hood 10 any further.

Once the lens hood 10 is secured in the position shown in FIGS. 19 and 20, It is prevented from rotating any further in the clockwise direction by the portion 66a of protrusion 66. Further, protrusion 66 and outer flange portion 64 prevent movement of the lens hood 10 in the axial direction.

To detach the lens hood 10 from the operating condition, the above attaching procedure is reversed.

When the lens hood 10 is not being used it can be attached in the non-operating position shown in FIGS. 2 and 4.

Figure 22:
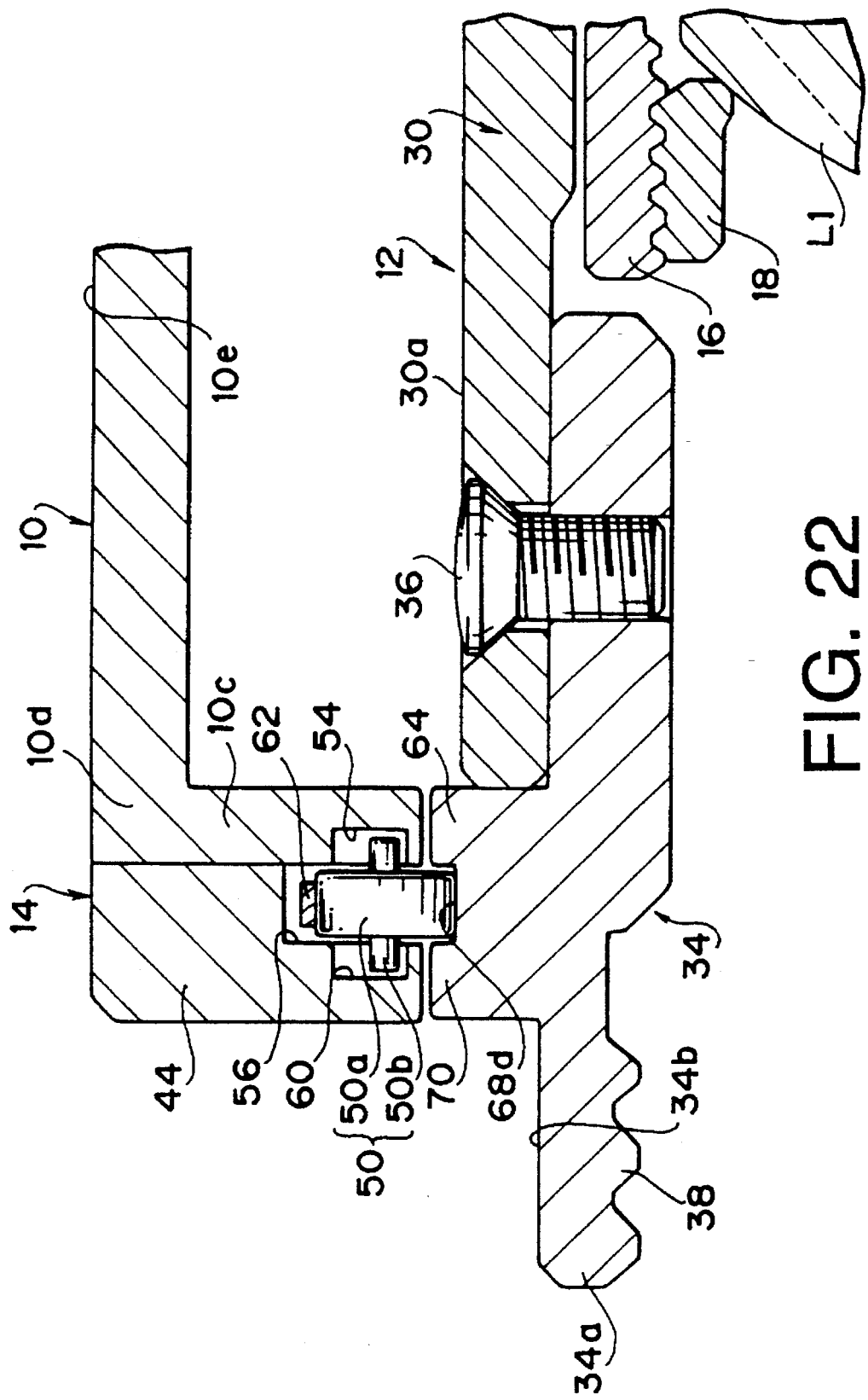
FIG. 22 is an enlarged side cross-sectional view of the lens hood attaching mechanism wherein the second roller is positioned in a click groove portion of the engaging groove, when the lens hood is in the non-operating position.

In the non-operating position, the lens hood 10 is reversed such that the distal end (without rollers 48 and 50) is first installed over the lens barrel 12. The lens hood 10 is then moved in the axial direction until the rollers 48 and 50 abut the outer flange portion 64, as shown in FIG. 22.

A similar attachment procedure to that described above, for the operating position, is done in order to secure the lens hood 10. However, the positions of the first and second rollers 48 and 50 are reversed, so that the second roller 50 is positioned in the click groove 68d instead of the first roller 48.

Thus, to attach the lens hood 10, it is first positioned such that roller 50 is in the guide groove 68a. The lens hood 10 is then rotated in the clockwise direction, such that the second roller 50 comes into contact with the slant groove portion 68b. As the lens hood 10 is turned in the clockwise direction, the second roller 50 is pressed towards its retracted position by the slant groove portion 68b, against the force of the ring spring 62. Further rotation of the lens hood 10 results in the second roller 50 contacting the frictional groove portion 68c.

To fully secure the lens hood 10 to the lens attaching mechanism 14, the second roller 50 must be moved to the click groove portion 68d. The lens hood 10 is thus further turned in the clockwise direction. However, the second roller 50, located in its most retracted state, exerts a force on the frictional groove portion 68c, which must be overcome by applying a torque T (see FIG. 21), in order to move the lens hood 10 any further.

Once the lens hood 10 is secured, it is prevented from rotating any further in the clockwise direction by the portion 66a of protrusion 66. Further, protrusion 66 and outer flange portion 64 prevent movement of the lens hood 10 in the axial direction.

To detach the lens hood 10 from the non-operating position, the above attaching procedure is reversed.

Figure 21:
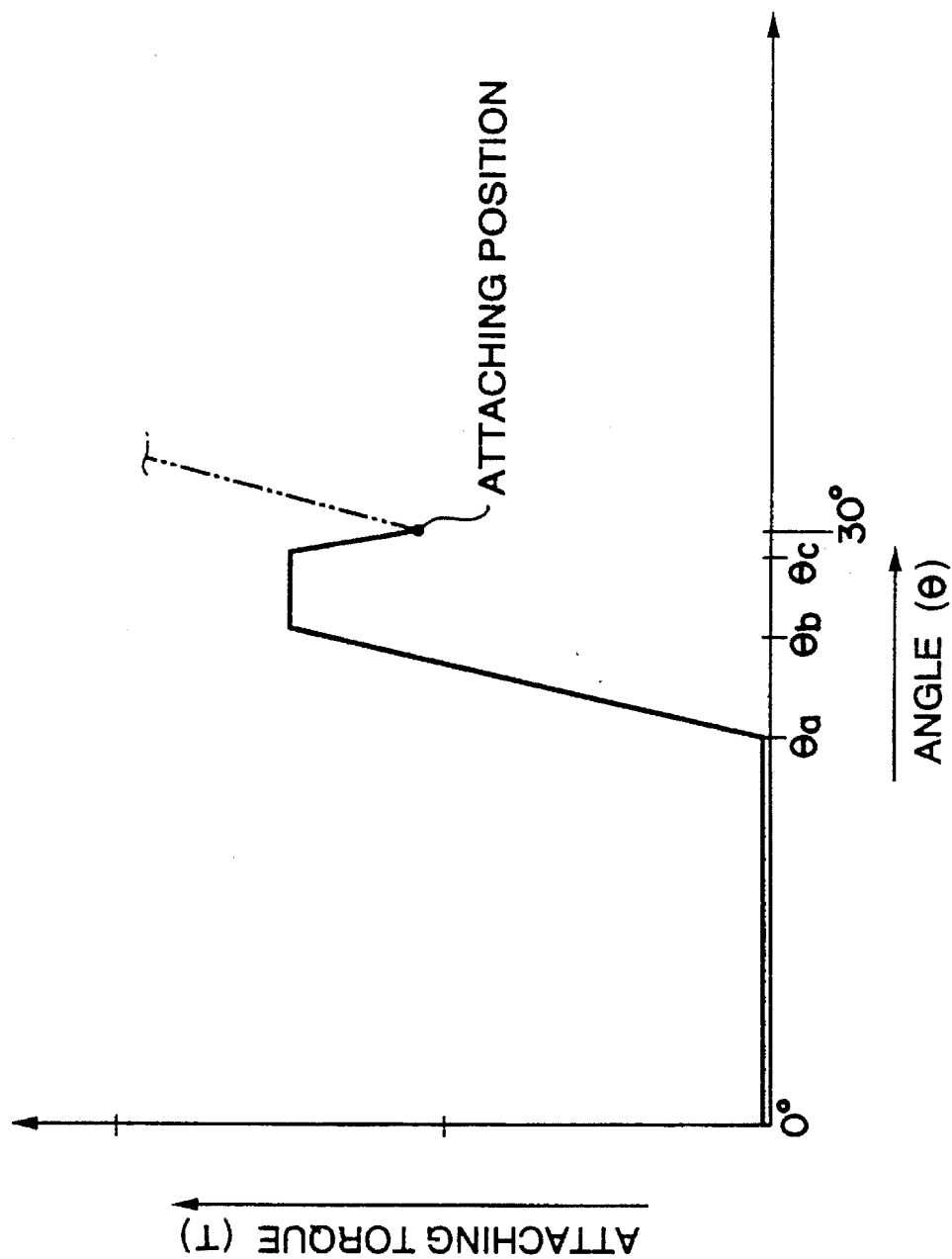
FIG. 21 is a diagram showing the relationship between an attaching torque T and an angle θ of the first roller.

FIG. 21 shows a relationship between the attaching torque T, as mentioned above, and an angle θ of separation between the first roller 48 and the distal end of the stopper wall 70 (which is the same as the start of the guide groove portion 68a). The distal end of the stopper wall 70 is defined as $\theta_O$ (the reference angle), having an angle of 0°. FIG. 6 shows the first roller 48 positioned at this reference angle.

A first angle $\theta_a$ of separation, between the first roller 48 and the reference angle, is defined when the when the first roller 48 is positioned at the junction of the guide groove portion 68a and the slant groove portion 68b, as shown in FIG. 18.

A second angle $\theta_b$ of separation, between the first roller 48 and the reference angle, is defined when the first roller 48 is positioned at the Junction of the slant groove portion 68b and the frictional groove portion 68c.

A third angle $\theta_c$ of separation, between the first roller 48 and the reference angle, is defined when the first roller 48 is positioned at the junction of the frictional groove portion 68c and the click groove portion 68d.

A fourth angle of separation, θ=30°, between the first roller 48 and the reference angle, is defined as the angle of rotation of the lens hood 10 required to place the first roller 48 into the click groove 68d, and thus secure the lens hood 10 to the lens attaching mechanism 14. This is shown in FIG. 19.

As shown in FIG. 21, it is necessary to apply a predetermined value of torque which is larger than the frictional force that resists the motion of the first roller 48, when it is positioned in the frictional groove portion 68c. Thus, when the first roller 48 is located in the click groove portion 68d, a larger torque must be applied in the counterclockwise direction in order to disengage the first roller 48, and move it out of the click groove portion 68d. This requirement prevents accidental disengagement of the lens hood 10 from the lens attaching mechanism 14.

Similarly, when the lens hood 10 is in the non-operating position, the second roller 50 is located in the click groove portion 68d, and large torque is also required in order to disengage the lens hood 10 from the lens attaching mechanism 14.

As shown in FIG. 8, values of a diameter d of each of the first and second rollers 48 and 50, an inner diameter $D_5$ of the annular groove 56 which is formed on the front surface of the annular member 44, the width h of the ring spring 62 in the radial direction and the diameter $D_2$ of the engaging protrusion 66 are defined so as to satisfy the following equation:

$$D_2+d+2h>D_5$$

If this equation is satisfied, further rotation of the lens hood 10, in the clockwise direction from the state where the first roller 48 is the click groove portion 68d, is prevented.

As mentioned above with reference to FIG. 5, since the diameter $D_0$ of the imaginary inscribed circle of the first and second rollers 48 and 50 is larger than the diameter $D_1$ of the outer circumferential surface 34b of the lens hood attachment ring 34, the outer circumferential surface 34b of the lens hood attachment ring 34 is not worn down by the first and second rollers 48 and 50 when the lens hood 10 is attached to or detached from the lens barrel 12. Also, as mentioned above with reference to FIG. 13, since the first roller 48 does not slide on the outer circumferential surface of the frictional engaging groove portion 68c, but is rolled thereon, the outer circumferential surface of the frictional engaging groove portion 68c is not worn down by the first roller 48. Accordingly, in the present embodiment, the entire outer circumferential surface of the lens hood attachment ring 34 is never worn down even when the lens hood 10 is attached to or detached from the lens barrel 12.

The angle of separation between the first roller 48 and its corresponding second roller 50 is also 30°. This is the same as the angle of separation between the distal end of stopper wall 70 and the click groove portion 68d. Thus, even if the lens hood has a rectangular cross-sectional area, the positional relationship between the lens hood 10 and lens barrel 12 remains the same whether the lens hood 10 is in the operating or non-operating position.

Further, the lens hood 10 can be mounted in a non-operating position, in the case that the device that it is mounted to (eg. a camera) is not being used. This allows for easy storage of the lens hood 10. Further the cross-sectional area of the lens barrel is not substantially increased when the lens hood 10 is mounted in either position. Thus, in the case that the lens hood 10 is mounted in the non-operating position, the case used to hold a camera or lens barrel will be able to accommodate the camera or lens barrel having the lens hood 10 mounted thereon. Thus, the lens hood 10 does not need a separate storage compartment, and so does not take up space in a camera bag.

The present invention is not limited to the embodiment described above, nor those illustrated in the drawings, and can be modified without departing from the spirit and scope of the claimed invention.

In the above embodiment, four pairs of first and second rollers 48 and 50 are provided as a plurality of the rollable members, however, it is possible in the present invention that at least two pairs of the first and second rollers 48 and 50 may be provided in order to accomplish the same function as the present invention. The first rollers 48 should be diametrically opposite each other. Likewise the second rollers 50, separated from the first rollers 48 by a predetermined angle, will also be diametrically opposite each other.

Figure 23:
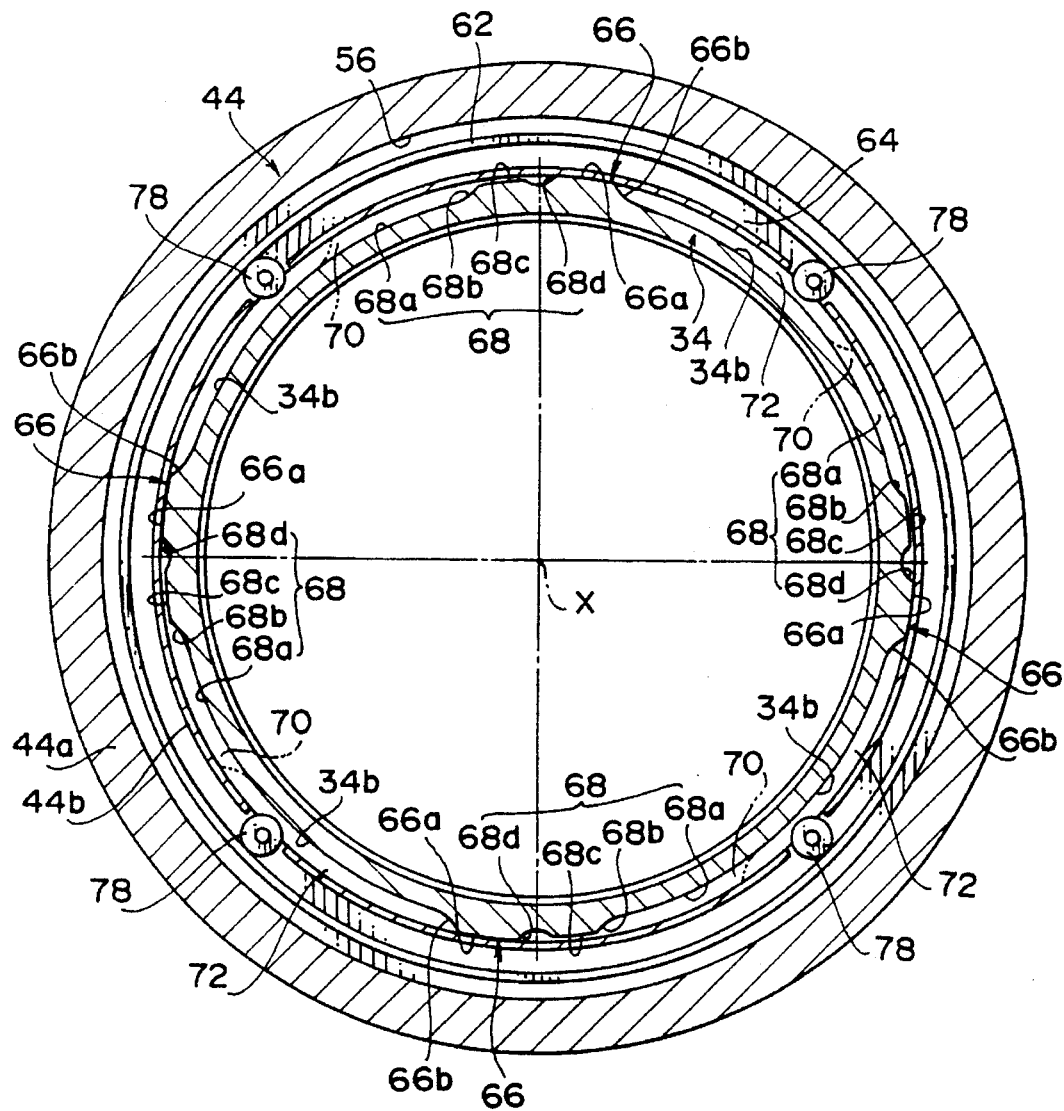
FIG. 23 is a front cross-sectional view along a line A—A of FIG. 5 showing the construction of the lens hood attaching mechanism according to a first modification of the present embodiment at the same state as shown in FIG. 6 wherein the common rollers are defined to be positioned at an angle θ=0°.

Also in the above embodiment, a plurality of pairs of the first and second rollers 48 and 50 are needed as a plurality of the rollable members because the recessed portion 74 is formed on the stopper wall 70 in front of the click groove portion 68*d*. However, if recessed portion 74 is not formed on the stopper wall 70, only a plurality of (that is, at least two) common rollers 78, as shown in FIG. 23, would be needed.

More specifically in the first modification, the four common rollers 78 are provided instead of four pairs of the first and second rollers 48 and 50 of the present embodiment. The four common rollers 78 are equally spaced (at 90 degrees) around the circumference of the lens hood 10. The attaching angle of the common roller 78 is set to 45°, in the first modification.

Figure 24:
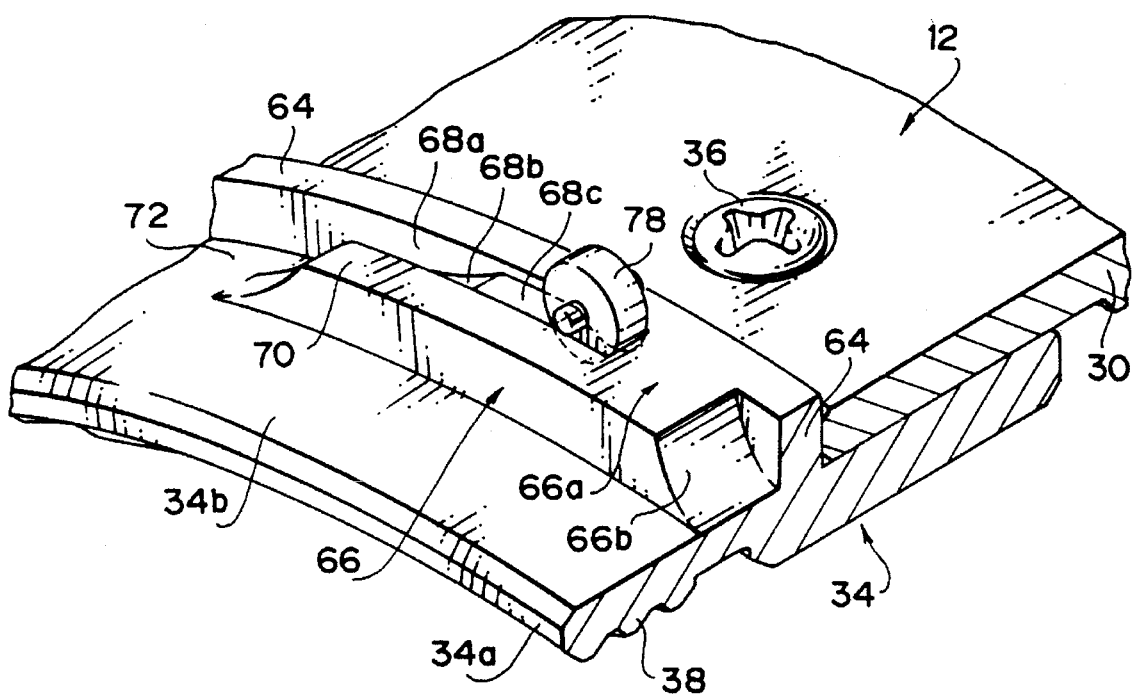
FIG. 24 is an enlarged and fragmentary perspective view showing the construction of the lens hood attaching mechanism according to a first modification of the present embodiment, for the same condition as shown in FIG. 20.

In the first modification as shown in FIG. 24, when each of the common rollers 78 is received in the corresponding click groove portion 68*d*, the lens hood 10 is prevented from rotating in the clockwise direction by the portion 66*a* of the protrusion 66. Torque must be applied in order to rotate the lens hood 10 in the counterclockwise direction, as explained for the first embodiment above. Thus, the lens hood 10 is securely held to the lens attaching mechanism.

Figure 25:
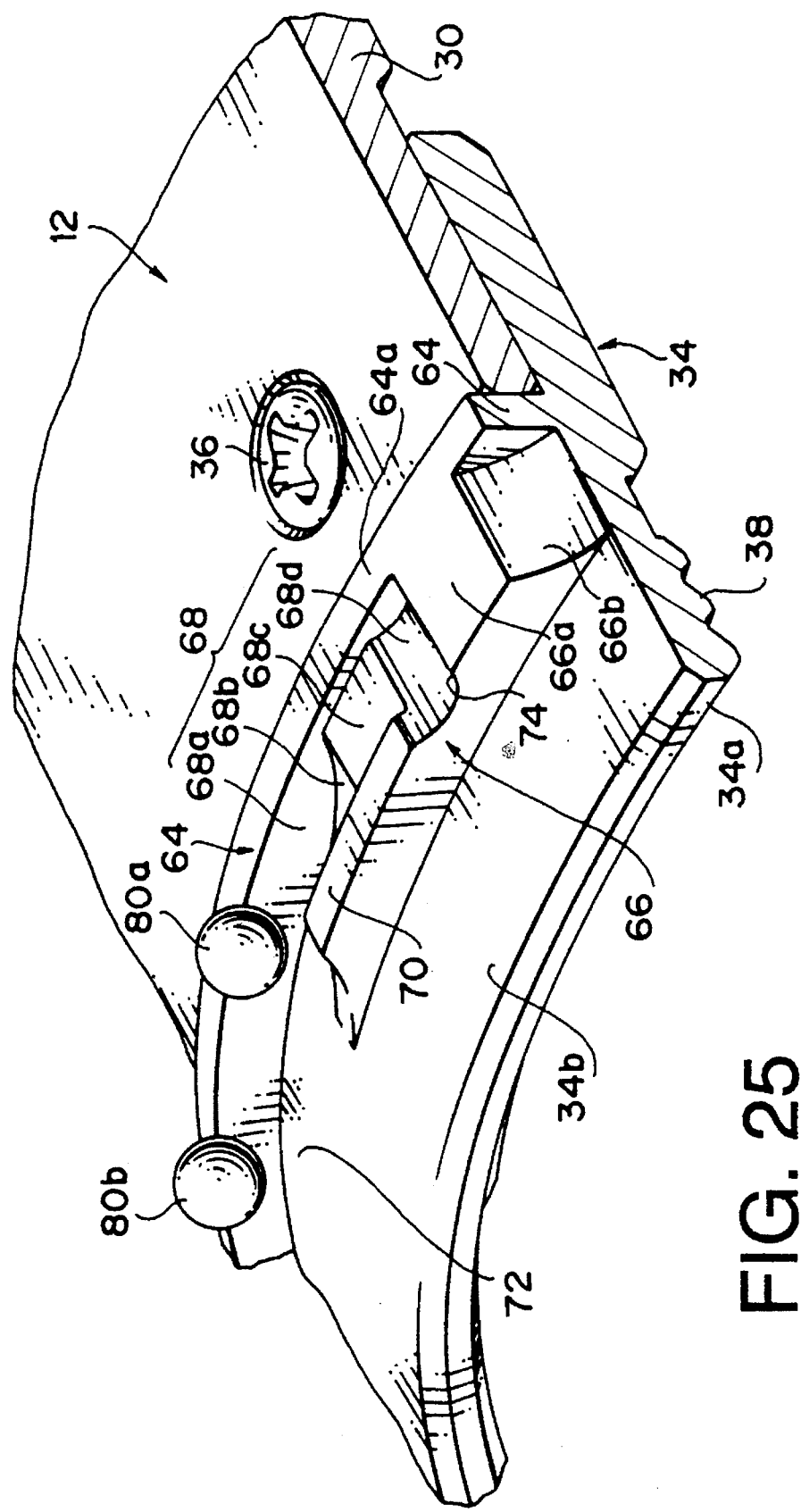
FIG. 25 is an enlarged perspective view showing the construction of the lens hood attaching mechanism on the lens barrel side according to a second modification of the present embodiment wherein the first and second balls are positioned in a click groove portion and guide groove portion of the engaging groove, respectively.

Further in the embodiment as described above first and second rollers 48 and 50 are used as the rollable members. However, it is possible to employ first and second balls 80*a* and 80*b* as the rollable members, as shown in FIG. 25, as a second modification of the embodiment. By employing first and second balls 80*a* and 80*b* instead of the first and second rollers 48 and 50 as rollable members, the diameter $D_0$ of the imaginary inscribed circle of the all balls 80 should be smaller than the diameter $D_1$ of the outer circumferential surface 34*b* of the lens hood attachment ring 34. Thus, it would be possible to reduce the outer size of the annular member 44 to which the first and second balls 80*a* and 80*b* are provided in.

In the embodiment as described above, the engaging groove 68 is constructed by the guide groove portion 68*a*, the slant groove portion 68*b*, the frictional engaging groove portion 68*c* and the click groove portion 68*d*, as described above. However, it is possible to modify the shape of the engaging groove, as shown in FIG. 26, as a third modification of the present embodiment.

An engaging groove 82 in the third modification is constructed by a slant groove portion 82*a* and a click groove portion 82*b* which is the same as the click groove portion 68*d* in the present embodiment. The bottom surface of the slant groove portion 82*a* is slanted away from the bottom surface of the outer circumferential surface 34*b* of the lens hood attachment ring 34, as shown in FIG. 26.

Figure 27:
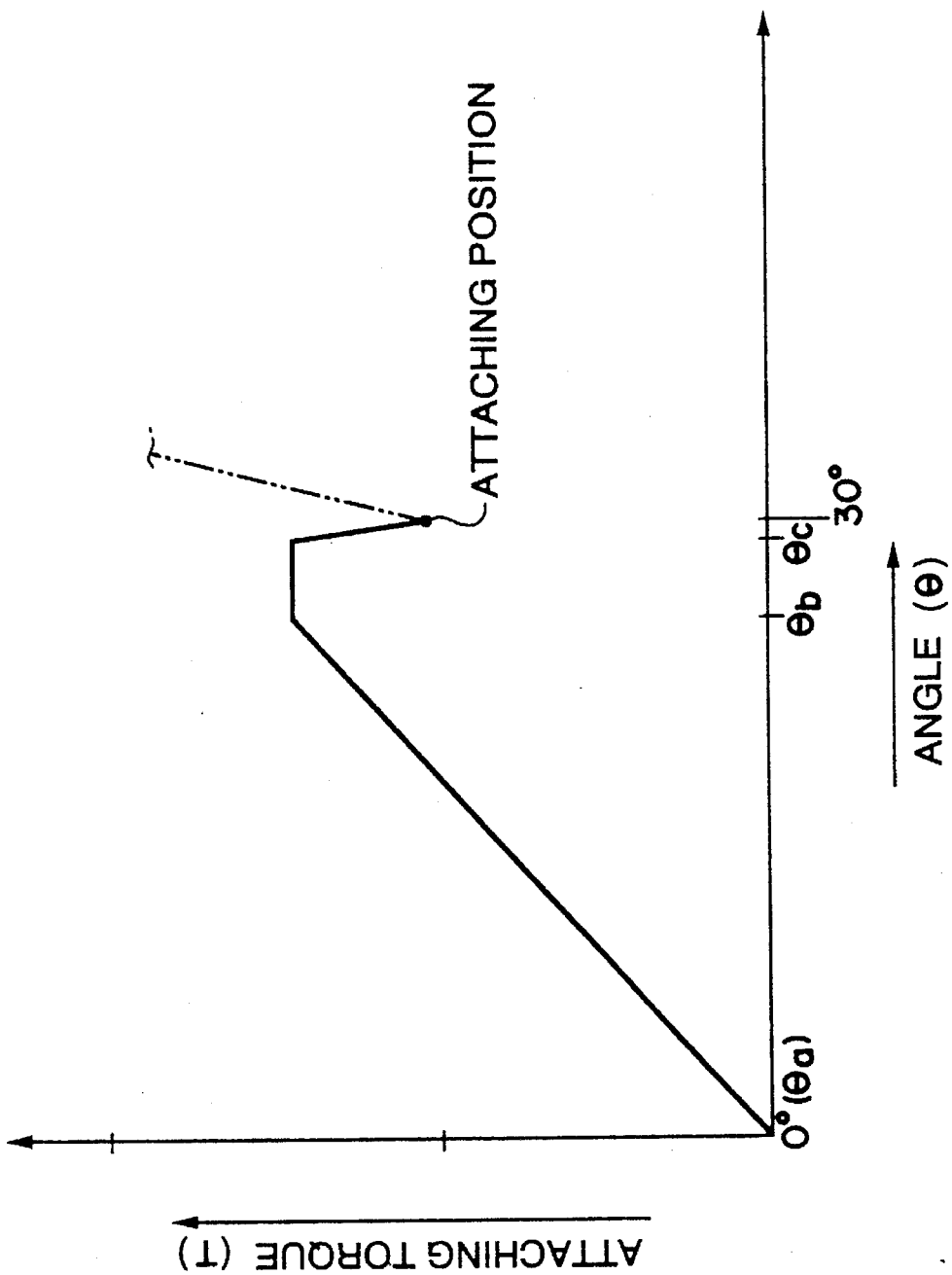
FIG. 27 is a diagram showing the relationship between an attaching torque T and an angle θ of the first roller in the third modification.

By forming the engaging groove 82 in the second embodiment, the change of the attaching torque T with respect to the angle θ is smoothly defined as shown in FIG. 27.

Figure 26:
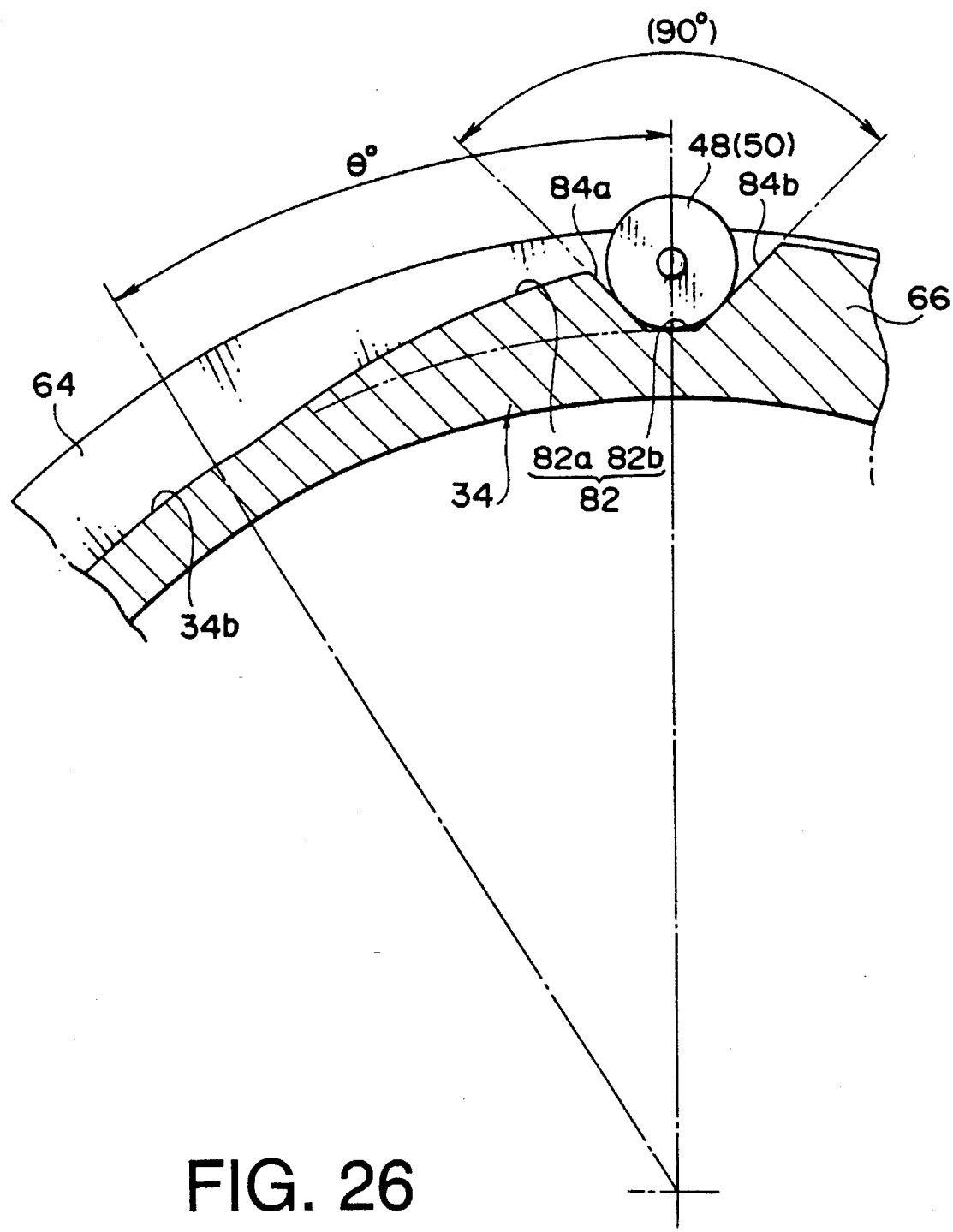
FIG. 26 is an enlarged front cross-sectional view showing the shape of the engaging groove in a third modification of the present embodiment.

In the third modification, the click groove portion 82*b* is formed to be restricted by both lateral planar surfaces 84*a* and 84*b*, as shown in FIG. 26, which are slanted with respect to the radial direction of the annular member 44 and which intersect at 90 degrees. By forming the click groove portion 82*b* this way, a different click feeling than that obtained in the first embodiment is obtained when either the first or second roller 48 or 50 is dropped into the click groove portion 82*b*.

In the embodiment as described above, the first and second rollers 48 and 50 are rotatably supported by inserting the front ends of the support shafts 48*b* and 50*b* into the corresponding first and second elongated holes 52 and 54, respectively, formed on the rear surface of the inner flange portion 10*c* of the lens hood 10, and the rear ends thereof, into the corresponding first and second elongate holes 58 and 60, respectively, formed on the front surface of the annular member 44.

Figure 28:
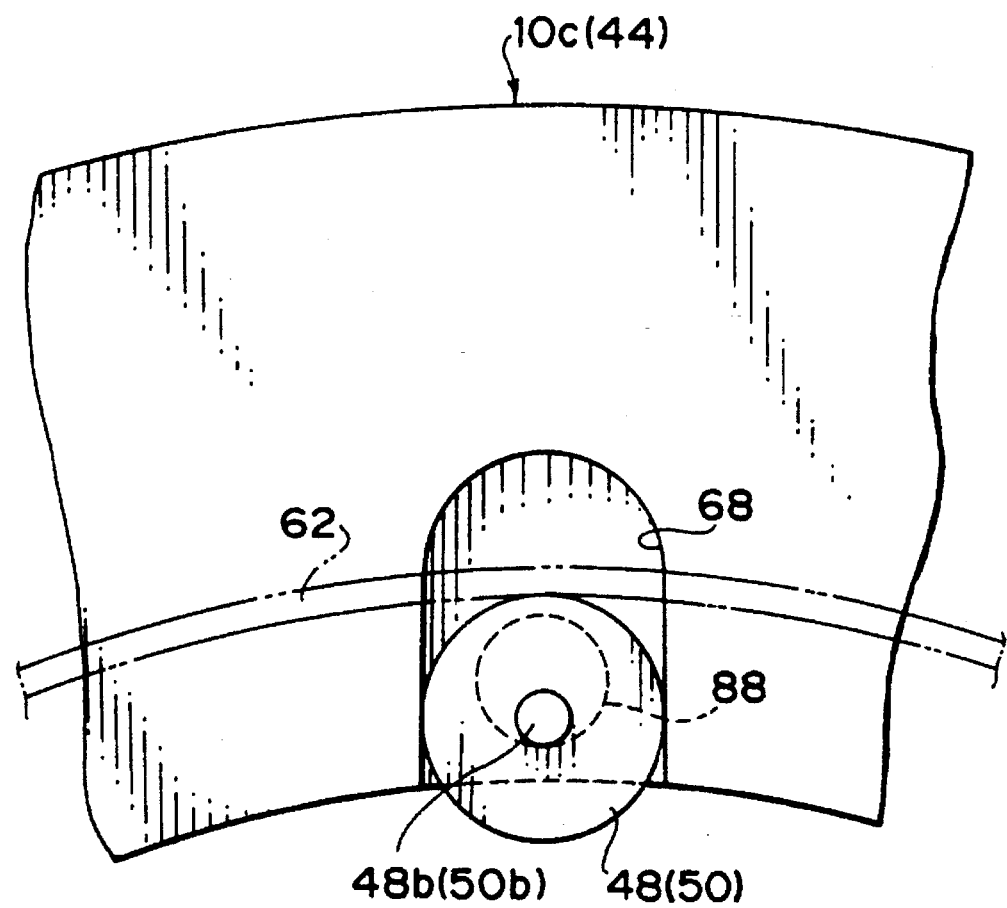
FIG. 28 is a view showing the shape of the elongated recess into which each of the first and second rollers are inserted, according to a fourth modification of the present embodiment.

However, it is possible that elongated recesses 86, into which the roller bodies 48*a* and 50*a* of the first and second rollers 48 and 50 are slidably inserted, are formed on the inner circumferential surfaces of the inner flange portion 10*c* of the lens hood 10 and the annular member 44 instead of the first and second elongated holes 52 and 54; 58 and 60 in the first embodiment, as shown in FIG. 28, as a fourth modification Each of the elongated recesses 86 extends in the radial direction of lens hood 10 and the annular member 44, and has a width corresponding to the diameter of each of the first and second rollers 48 and 50. Thus, the first and second rollers 48 and 50 are slidably guided to move in the radial direction of the lens hood 10 and the annular member 44. Circular holes 88, into which the support shafts 48*b* and 50*b* of the first and second rollers 48 and 50 are loosely inserted, are formed on the rear surface of the elongated recesses 86 on the lens hood 10 side and formed on the front surface of the elongated recesses 86 on the annular member 44, so that the first and second rollers 48 and 50 are prevented from dropping out of the elongated recesses 86.

Figure 29:
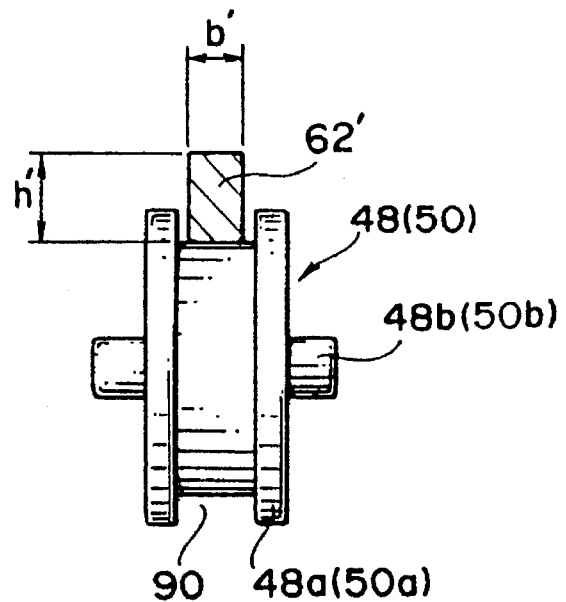
FIG. 29 is a side view of the first or second rollers urged by the ring spring according to a fifth modification of the present embodiment.
Figure 30:
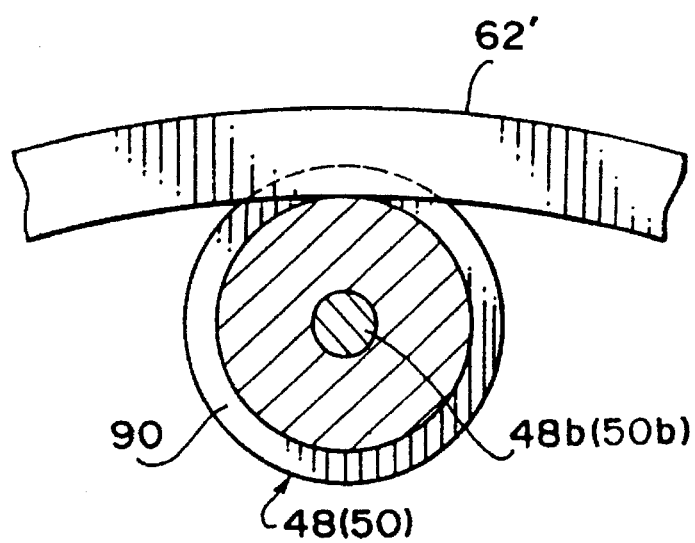
FIG. 30 is a front view of the first or second roller and the ring spring according to the fifth modification.

In the embodiment as mentioned above, the ring spring 62 has a shape as shown in FIG. 9. However, it is possible to modify the ring spring 62, as shown In FIGS. 29 and 30, as a fifth modification. More specifically, the ring spring 62' of the fourth modification has the width b' smaller than the width b in the first embodiment. In this case, the urging force of the ring spring 62' will be substantially the same as that of the ring spring 62 of the first embodiment whereby the height h' of the ring spring 62' is set to be larger than the height h of the ring spring 62.

Further in the fifth modification, a groove 90 can be formed on the outer circumferential surface of each of the roller bodies 48*a* and 50*a* of the first and second rollers 48 and 50 since the width b' of the ring spring 62' is set to be smaller than the width of each of the roller bodies 48*a* and 50*b*. Accordingly, the ring spring 62' can be engaged with the groove 92 of each of the first and second rollers 48 and 50 so that the ring spring 62' is prevented from being disengaged from the outer circumferential surface of the roller bodies 48*a* and 50*a*. By forming the groove 90 with which the ring spring 62' is engaged, the ring spring 62' can be formed into a circular shape in cross section.

In the embodiment as described above, the lens hood 10 is utilized as the lens accessory for the lens barrel 12. However, it is possible to apply the present invention to another lens accessory which is detachably attached to the distal end of the lens barrel 12. Furthermore, the lens accessory can be detachably attached to not only the lens barrel 12 of the camera but also to that of a telescope by means of the lens accessory attaching mechanism according to the present invention.

The present disclosure relates to subject matters contained in Japanese Patent Application No. HEI 5-37124 filed on Feb. 25, 1993, which is expressly incorporated herein by reference in its entirety.

What is claimed is:

1. A lens accessory attaching mechanism for detachably attaching a lens accessory to a lens barrel, comprising:

at least two rollable members provided at one end portion of the lens accessory into which a distal end of the lens barrel is inserted, the rollable members being equiangularly arranged in a circumferential direction of the lens accessory and being movable in a radial direction thereof and urged to move radially inward;

restricting means formed on an outer periphery of the lens barrel, for restricting insertion of the lens accessory to the lens barrel in an axial direction thereof by being abutted against the rollable members: and a plurality of engaging means having a same number as that of the rollable members, said engaging means being formed on the outer periphery of the lens barrel in front of the restricting means, and equiangularly arranged in the circumferential direction of the lens barrel, for being engaged with the rollable members upon rotation of the lens accessory in one direction while the rollable members abut against the restricting means.

2. The mechanism according to claim 1, wherein the lens barrel includes a lens accessory attachment ring which is fixed to the distal end of the lens barrel by fixing means, the restricting means and the engaging means being formed on an outer circumferential surface of the lens accessory attachment ring.

3. The mechanism according to claim 2, wherein the restricting means includes an outer flange portion formed around the entire outer circumferential surface of the lens accessory attachment ring to extend radially outwardly so that the rollable members abut against the outer flange portion in the axial direction.

4. The mechanism according to claim 3, wherein each of the engaging means includes;

an engaging protrusion which is integrally formed with the outer flange portion and the lens accessory attachment ring, and an engaging groove which is formed on the outer circumferential surface of the engaging protrusion and extends in the circumferential direction and with which a corresponding rollable member is engaged.

5. The mechanism according to claim 4, wherein said engaging groove includes:

a slant groove portion slanted to the outer circumferential surface of the lens accessory attachment ring so as to increase a diameter thereof in one direction, and a click groove portion arranged on a same side as the slant groove portion and into which the corresponding rollable member is fitted.

6. The mechanism according to claim 5, wherein said engaging groove further includes:

a guide groove portion bottom surface which is flush with the outer circumferential surface of the lens accessory attachment ring and opens to a space above the outer circumferential surface thereof on a side in a direction opposite the click groove portion, and a frictional engaging groove portion, the bottom surface of which extends radially outward from the outer circumferential surface of the lens accessory attachment ring and from the bottom of the click groove portion and radially inward from the outer circumferential surface of the engaging protrusion and is arranged between the slant groove portion and the click groove portion.

7. The mechanism according to claim 5, wherein the slant groove portion is directly opened to a space above the outer circumferential surface of the lens accessory attachment ring in a direction opposite the direction of the click groove portion and directly connected to the click groove portion on a side in the one direction.

8. The mechanism according to claim 5, wherein a stopper wall is formed in front of the engaging groove in each of the engaging protrusions.

9. The mechanism according to claim 8, wherein the stopper wall is formed on the entire length of the front side of the engaging groove.

10. The mechanism according to claim 9, wherein each of the rollable members includes a common roller which is rotatably supported about its central axis parallel to a central axis of the lens accessory.

11. The mechanism according to claim 10, wherein the common roller is received in the click groove portion and clamped between the stopper wall and the outer flange portion when the lens accessory is attached to the lens barrel so as to extend from the distal end of the lens barrel to the front side in a using condition, and also received in the click groove portion and clamped between the stopper wall and the outer flange portion when the lens accessory is attached to the lens barrel to be retracted from the distal end of the lens barrel to the rear side in a non-using condition.

12. The mechanism according to claim 8, wherein a recessed portion is formed in front of the click groove portion in the stopper wall.

13. The mechanism according to claim 12 wherein each of the rollable members includes a first roller and a second roller which is circumferentially displaced from the first roller in a direction opposite to the one direction, and the first and second rollers being rotatably supported about their respective central axes parallel to the central axis of said lens accessory.

14. The mechanism according to claim 13, wherein the first roller is received in the click groove portion and the second roller is clamped between the stopper wall and the outer flange portion when the lens accessory is attached to the lens barrel so as to extend from the distal end of the lens barrel to the front side in a using condition, and the second roller is received in the click groove portion and the first roller is clamped between the stopper wall and the outer flange portion when the lens accessory is attached to the lens barrel to be retracted from the distal end of the lens barrel to the rear side in a non-using condition.

15. The mechanism according to claim 1, wherein the lens accessory is a lens hood.

16. The mechanism according to claim 1, which further comprises:

urging means for urging the rollable members to move radially inward of said lens accessory.

17. The mechanism according to claim 16 wherein the urging means includes a ring spring arranged around the rollable members to urge the rollable members radially inward.

18. The mechanism according to claim 17, wherein the ring spring urgingly contacts the outer peripheral surface of each of the rollable members.

19. The mechanism according to claim 18, wherein the rollable member is a roller which is rotatably supported about its central axis parallel to the central axis of the lens accessory.

20. The mechanism according to claim 19, wherein the roller has a circumferential groove formed on the outer circumferential surface thereof, and the ring spring is engaged with the circumferential groove.

21. The mechanism according to claim 1, wherein each of the rollable members includes a roller which is rotatably supported about its central axis parallel to a central axis of the lens accessory.

22. The mechanism according to claim 1, wherein each of the rollable members includes a first roller, and a second roller which is displaced from the first roller in a direction opposite to the one direction, and said first and second rollers being rotatably supported about their respective central axes parallel to a central axis of the lens accessory.

23. A lens accessory attaching mechanism for detachably attaching a lens accessory to a lens barrel, which comprises:

at least two rollable members provided at one end portion of the lens accessory which has an inner circumferential surface into which an outer circumferential surface of the lens barrel is inserted, the rollable members being equiangularly arranged in a circumferential direction of the lens accessory and being movable in a radial direction thereof;

a ring spring arranged around all of the rollable members to urge them radially inward;

an outer flange portion formed around an outer circumferential surface of a lens accessory attachment ring to extend radially outward, for restricting insertion of the lens accessory relative to the lens barrel in an axial direction thereof, by a predetermined amount of the insertion being abutted against the rollable members; and a plurality of engaging means, a number of which corresponds to a number of the rollable members, said engaging means being formed on the outer circumferential surface of the lens barrel in front of a restricting means, and equiangularly arranged in a circumferential direction of the lens barrel, for engagement with the respective rollable members upon rotation of the lens accessory in one direction, while the rollable members abut against the restricting means.

24. The mechanism according to claim 23, wherein the lens barrel includes the lens accessory attachment ring which is fixed to a distal end of the lens barrel by fixing means, and the outer flange portion and engaging means are formed on the outer circumferential surface of the lens accessory attachment ring.

25. The mechanism according to claim 24, wherein each of the engaging means includes;

an engaging protrusion which is integrally formed with the outer flange portion and the lens accessory attachment ring, and an engaging groove which is formed on the outer circumferential surface of the engaging protrusion and extends in the circumferential direction and with which a corresponding rollable member is engaged.

26. The mechanism according to claim 25, wherein the engaging groove includes;

a slant groove portion slanted to the outer circumferential surface of the lens accessory attachment ring so as to increase a diameter thereof in one direction; and a click groove portion arranged on a same side as the slant groove portion and into which the corresponding rollable member is dropped.

27. The mechanism according to claim 26, wherein said engaging groove further includes:

a guide groove portion bottom surface which is flush with the outer circumferential surface of the lens accessory attachment ring and opened to a space above the outer circumferential surface thereof on a side in a direction opposite the direction of the click groove portion, and a frictional engaging groove portion, the bottom surface of which extends radially outward from the outer circumferential surface of the lens accessory attachment ring and from the bottom of the click groove portion and radially inward from the outer circumferential surface of the engaging protrusion and arranged between the slant groove portion and the click groove portion.

28. The mechanism according to claim 27, wherein the ring spring urgingly contacts the outer peripheral surface of each of the rollable members.

29. The mechanism according to claim 26, wherein a stopper wall is formed in front of the engaging groove in each of the engaging protrusions.

30. The mechanism according to claim 29, wherein the stopper wall is formed on the entire length of the front side of the engaging groove.

31. The mechanism according to claim 30, wherein each of the rollable members includes a common roller which is rotatably supported about its central axis parallel to a central axis of the lens accessory, and the common roller being received in the click groove portion and clamped between the stopper wall and the outer flange portion when the lens accessory is attached to the lens barrel so as to extend from the distal end of the lens barrel to the front side in a using condition, and also being received in the click groove portion and clamped between the stopper wall and the outer flange portion when the lens accessory is to the lens barrel to be retracted from the distal end of the lens barrel to the rear side in a non-using condition.

32. The mechanism according to claim 29, wherein a recessed portion is formed in front of the click groove portion in the stopper wall.

33. The mechanism according to claim 32, wherein each of the rollable members includes a first roller, and a second roller which is displaced from the first roller in a direction opposite to the one direction, the first and second rollers being rotatably supported about their respective central axes parallel to the central axis of the lens accessory, the first roller being received in the click groove portion and the second roller being clamped between the stopper wall and the outer flange portion when the lens accessory is attached to the lens barrel so as to extend from the distal end of the lens barrel to the front side in a using condition, and the second roller being received in the click groove portion and the first roller being clamped between the stopper wall and the outer flange portion when the lens accessory is attached to the lens barrel to be retracted from the distal end of the lens barrel to the rear side in a non-using condition.

34. The mechanism according to claim 23, wherein the lens accessory is a lens hood.

35. A lens accessory which is to be attached to a lens barrel, which comprises:

an annular member secured to a proximal end portion of the lens accessory;

at least two rollable means provided between the proximal end and the annular member, the rollable means being equiangularly arranged in a circumferential direction of the lens accessory and being movable in a radial direction thereof; and a ring spring arranged around the rollable means to urge them radially inward thereby protruding a part of each of the rollable means radially inward from an inner circumferential surface of the annular member.

36. The lens accessory according to claim 35, wherein each of the rollable means includes a common roller which is rotatably supported about its central axis parallel to a central axis of the lens accessory.

37. The mechanism according to claim 35, wherein each of the rollable means includes a first roller and a second roller which is displaced from the first roller in a direction opposite to a predetermined direction, the first and second rollers being rotatably supported about their respective central axes parallel to a central axis of the lens assembly.

* * * * *

UNITED STATES PATENT AND TRADEMARK OFFICE
CERTIFICATE OF CORRECTION

PATENT NO. : 5,483,384
DATED : January 9, 1996
INVENTOR(S) :
M. TAKIZAWA et al.

It is certified that error appears in the above-indentified patent and that said Letters Patent is hereby corrected as shown below:

At column 15, line 60 (claim 26, line 2), change ";" to ---:---.
At column 16, line 37 (claim 31, line 12), after "is" insert ---attached---.

Signed and Sealed this

Twenty-ninth Day of October 1996

Attest:

BRUCE LEHMAN

Attesting Officer   Commissioner of Patents and Trademarks